(12) United States Patent
Yang et al.

(10) Patent No.: US 12,222,608 B2
(45) Date of Patent: Feb. 11, 2025

(54) LIGHT ADJUSTMENT PANEL, OVERLAPPED SCREEN PANEL, AND METHOD OF MANUFACTURING LIGHT ADJUSTMENT PANEL

(71) Applicants: HEFEI BOE OPTOELECTRONICS TECHNOLOGY CO., LTD., Hefei Anhui (CN); BOE TECHNOLOGY GROUP CO., LTD., Beijing (CN)

(72) Inventors: Jie Yang, Beijing (CN); Yuansheng Zang, Beijing (CN); Yijun Wang, Beijing (CN); Ru Zhou, Beijing (CN); Xingkui Guo, Beijing (CN); Xufei Xu, Beijing (CN)

(73) Assignees: HEFEI BOE OPTOELECTRONICS TECHNOLOGY CO., LTD., Hefei Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/245,501

(22) PCT Filed: Mar. 25, 2022

(86) PCT No.: PCT/CN2022/083104
§ 371 (c)(1),
(2) Date: Mar. 15, 2023

(87) PCT Pub. No.: WO2023/178666
PCT Pub. Date: Sep. 28, 2023

(65) Prior Publication Data
US 2024/0288732 A1     Aug. 29, 2024

(51) Int. Cl.
*G02F 1/1343* (2006.01)

(52) U.S. Cl.
CPC .... *G02F 1/134336* (2013.01); *G02F 1/13439* (2013.01)

(58) Field of Classification Search
CPC ................ G02F 1/134336; G02F 1/13439
See application file for complete search history.

(56) References Cited

U.S. PATENT DOCUMENTS

| | | |
|---|---|---|
| 2013/0314632 A1 | 11/2013 | Zohrabyan et al. |
| 2016/0093252 A1 | 3/2016 | Harada et al. |
| 2019/0157363 A1* | 5/2019 | Lee ........... H10K 50/81 |

(Continued)

FOREIGN PATENT DOCUMENTS

| | | |
|---|---|---|
| CN | 104898330 A | 9/2015 |
| CN | 108983463 A | 12/2018 |

(Continued)

*Primary Examiner* — Lucy P Chien
(74) *Attorney, Agent, or Firm* — Myers Bigel, P.A.

(57) ABSTRACT

There is provided are a light adjustment panel, an overlapped screen panel, and a method of manufacturing a light adjustment panel. The light adjustment panel includes a common electrode layer, a control electrode layer, a light adjustment liquid crystal layer, arranged in stack, and auxiliary electrodes. The control electrode layer includes control electrodes arranged in an array, and there is a gap between adjacent control electrodes. The orthographic projection of the gap on the common electrode layer at least partially overlaps with the orthographic projections of the auxiliary electrodes on the common electrode layer.

18 Claims, 15 Drawing Sheets

(56) References Cited

U.S. PATENT DOCUMENTS

| | | |
|---|---|---|
| 2020/0292894 A1 | 9/2020 | Liu et al. |
| 2021/0405423 A1 | 12/2021 | Yang et al. |
| 2022/0308411 A1 | 9/2022 | Huang et al. |

FOREIGN PATENT DOCUMENTS

| | | |
|---|---|---|
| CN | 110221496 A | 9/2019 |
| CN | 110673411 A | 1/2020 |
| CN | 110780500 A | 2/2020 |
| CN | 110824739 A | 2/2020 |
| CN | 110824740 A | 2/2020 |
| CN | 111142287 A | 5/2020 |
| CN | 211149139 U | 7/2020 |
| CN | 112198727 A | 1/2021 |
| CN | 112433416 A | 3/2021 |
| CN | 213987120 U | 8/2021 |

\* cited by examiner

LIGHT ADJUSTMENT PANEL, OVERLAPPED SCREEN PANEL, AND METHOD OF MANUFACTURING LIGHT ADJUSTMENT PANEL

CROSS REFERENCE TO RELATED APPLICATIONS

The present application claims the priority of PCT Application No. PCT/CN2022/083104 filed on Mar. 25, 2022, the content of which is incorporated herein by reference in its entirety.

FIELD

The present application relates to the field of liquid crystal display technology, and in particular to a light adjustment panel, an overlapped screen panel, and a method for manufacturing a light adjustment panel.

BACKGROUND

Conventional liquid crystal displays have the disadvantages of insufficient color gamut and low contrast ratio (the contrast ratio is about 1000:1). Color gamut refers to the set of colors that a display device can display. Contrast ratio refers to the ratio between the brightest brightness and the darkest brightness that a display device can display.

To achieve high contrast, one approach is to use submillimeter light-emitting diode (also known as Mini LED) technology. Mini LED technology utilizes a large number of small LED light sources to achieve light adjustment of many backlight zones. However, as limited by the large number of LEDs, the Mini LED technology has high power consumption, low yield, and high cost.

Another approach is to use overlapped screen display technology. The product of the overlapped screen display technology includes two laminated panels, namely the display panel (also called the main cell) and the light adjustment panel (also called the sub cell). The display panel is mainly used to control the color and pattern of the displayed picture. The light adjustment panel includes multiple light adjustment zones that are independently controlled, which can realize the adjustment of local backlight, thereby improving the contrast of the picture, making the picture display clearer, the color expression stronger, and the color transition smoother. The overlapped screen display technology can increase the contrast ratio of the liquid crystal display from the order of 1000:1 to the order of 1000000:1, and also has lower power consumption and cost.

However, in some related overlapped screen display panels, the problem of uneven brightness (mura) may appear at the gap between zones of the light adjustment panel. For example, light leaks or dark areas appear between light adjustment zones. Moreover, the light adjustment panel may affect the overall transmittance of the display panel.

SUMMARY

According to an aspect of the present disclosure, there is provided a light adjustment panel. The light adjustment panel comprises a common electrode layer, a control electrode layer and a light adjustment liquid crystal layer arranged in stack, and auxiliary electrodes, wherein the control electrode layer comprises control electrodes arranged in an array, and a gap is provided between adjacent ones of the control electrodes, wherein an orthographic projection of the gap on the common electrode layer is at least partially overlapped with an orthographic projection of a corresponding one of the auxiliary electrodes on the common electrode layer.

In some embodiments, the gap comprises a first boundary, a second boundary, a weak alignment region and a non-weak alignment region, wherein the weak alignment region is closer to the first boundary than the non-weak alignment region, and the non-weak alignment region is closer to the second boundary than the weak alignment region, wherein the light adjustment liquid crystal layer comprises a first light adjustment liquid crystal and a second light adjustment liquid crystal, an orthographic projection of the first light adjustment liquid crystal on the gap is in the weak alignment region, and an orthographic projection of the second light adjustment liquid crystal on the gap is in the non-weak alignment region, wherein an average anchoring energy of the first light adjustment liquid crystal is smaller than an average anchoring energy of the second light adjustment liquid crystal, wherein an orthographic projection of the first boundary on the corresponding one of the auxiliary electrodes is closer to a midline of the corresponding one of the auxiliary electrodes than an orthographic projection of the second boundary on the corresponding one of the auxiliary electrodes.

In some embodiments, a distance between an orthographic projection of a midline of the gap on the common electrode layer and an orthographic projection of the midline of the corresponding one of the auxiliary electrodes on the common electrode layer is in a range of 0.5 µm to 1.5 µm.

In some embodiments, the control electrodes arranged in the array are arranged along a first direction and a second direction, with the first direction being at an angle to the second direction, wherein the light adjustment panel further comprises a gate line layer, wherein the gate line layer comprises gate lines, each of the gate lines is electrically connected to a corresponding one of the control electrodes, the gate lines extend along the first direction, wherein the auxiliary electrodes comprise first auxiliary electrodes extending along the first direction, wherein orthographic projections of the first auxiliary electrodes and the gate lines on the common electrode layer are arranged in parallel and spaced from each other.

In some embodiments, a distance between any adjacent two of the orthographic projections of the first auxiliary electrodes and the gate lines on the common electrode layer is same.

In some embodiments, the light adjustment panel further comprises dummy wires, wherein the dummy wires extend along the second direction, wherein the auxiliary electrodes further comprises second auxiliary electrodes extending along the second direction, wherein orthographic projections of the dummy wires and the second auxiliary electrodes on the common electrode layer are arranged in parallel and spaced from each other.

In some embodiments, the gate lines are bent at inflection points, and orthographic projections of straight lines where the dummy wires are located on the gate line layer pass through the inflection points.

In some embodiments, at least two of the dummy wires, the gate lines, and the auxiliary electrodes are in a same layer.

In some embodiments, the light adjustment panel further comprises a voltage control chip, wherein the voltage control chip is configured to be connected to the gate lines through output pins, and to be connected to the control electrodes through the gate lines, to control voltage of the control electrodes, wherein all of the control electrodes are connected to output pins with a same voltage polarity.

In some embodiments, the corresponding one of the auxiliary electrodes is electrically connected to one of the control electrodes on both sides of the gap.

In some embodiments, the common electrode layer is sandwiched between the light adjustment liquid crystal layer and the control electrode layer, wherein the common electrode layer comprises strip electrodes arranged in parallel, the auxiliary electrodes are located in the common electrode layer, and are parallel to and electrically connected to the strip electrodes.

In some embodiments, the control electrodes arranged in the array are arranged along a first direction and a second direction, wherein the first direction is at an angle less than 90° to the second direction, wherein the strip electrodes extend along the first direction.

In some embodiments, the angle between the first direction and the second direction is between 75° and 85°.

In some embodiments, the control electrodes comprise a first control electrode and a second control electrode adjacent along the first direction, wherein the first control electrode and the second control electrode respectively comprise first edges extending along the first direction and second edges extending along the second direction, wherein the second edge of the first control electrode close to the second control electrode comprises protrusions that are spaced from each other, and the second edge of the second control electrode close to the first control electrode comprises concaves that are spaced from each other, wherein the protrusions are at least partially aligned with the concaves along the first direction.

In some embodiments, a width of the auxiliary electrodes is one to two times as a width of the gap.

According to another aspect of the present disclosure, there is provided an overlapped screen panel, comprising the light adjustment panel according to any one of the embodiments of the present application, and a display panel stacked with the light adjustment panel.

According to yet another aspect of the present disclosure, there is provided a method of manufacturing a light adjustment panel, comprising: providing a substrate, forming a control electrode layer on the substrate, wherein the control electrode layer comprises control electrodes arranged in an array, and a gap is provided between adjacent ones of the control electrodes, forming auxiliary electrodes on the substrate, wherein an orthographic projection of the gap on the substrate is at least partially overlapped with an orthographic projection of a corresponding one of the auxiliary electrodes on the substrate.

In some embodiments, forming the auxiliary electrodes on the substrate comprises:
    forming a first electrode material layer on the substrate; and performing a first exposure and etching operation on the first electrode material layer to obtain the auxiliary electrodes;
    wherein the method further comprises forming a first insulating layer on a side of the auxiliary electrodes away from the substrate; and wherein forming the control electrode layer on the substrate comprises: forming a second electrode material layer on a side of the first insulating layer away from the substrate; and performing a second exposure and etching operation on the second electrode material layer to obtain the control electrode layer.

In some embodiments, forming the control electrode layer on the substrate comprises: forming a third electrode material layer on the substrate, and performing a third exposure and etching operation on the third electrode material layer to obtain the control electrode layer;
    wherein the method further comprises forming a second insulating layer on a side of the control electrode layer away from the substrate; wherein forming the auxiliary electrodes on the substrate comprises: forming a fourth electrode material layer on a side of the second insulating layer away from the substrate, and performing a fourth exposure and etching operation on the fourth electrode material layer to obtain the auxiliary electrodes.

BRIEF DESCRIPTION OF DRAWINGS

In order to describe the technical solutions in the embodiments of the present disclosure more clearly, the drawings that need to be used in the embodiments will be briefly introduced below. Apparently, the drawings in the following description are only some embodiments of the present disclosure, and those skilled in the art can obtain other drawings according to these drawings without creative efforts. In the drawings of this application.

DETAILED DESCRIPTION

Figure 1A:
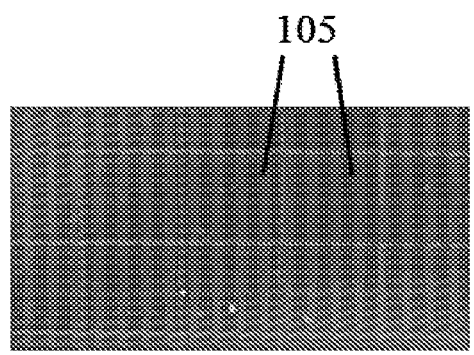
FIG. 1A and FIG. 1B schematically show the situation of light leakage and dark areas at the gap between the control electrodes of the related light adjustment panel, respectively.

The technical solutions in the embodiments of the present disclosure will clearly and completely described with reference to the drawings in the embodiments of the present disclosure. Apparently, the described embodiments are only some of the embodiments of the present disclosure, not all of them. All other embodiments obtained by persons of ordinary skill in the art based on the embodiments of the present disclosure without making creative efforts belong to the protection scope of the present disclosure.

In the related overlapped screen display technology, an approach is to apply a high-resolution light adjustment panel, whose resolution may reach ½ of the resolution of the display panel, or even higher. For example, in case the display panel has 4K resolution, the resolution of the light adjustment panel can reach 2K. High-resolution light adjustment panels can have up to millions of light adjustment zones, and are typically driven actively, that is, each zone has a separate switching element, such as a thin-film transistor (TFT). This will reduce the transmittance of the light adjustment panel, and the large quantity of the zones will increase the burden on the system's computing capability. It should also be noted that if the resolutions of both the display panel and the light adjustment panel are high, it means that the sizes of the pixels and light adjustment zones are small, but the accuracy of the traditional panel assemble technology may not be enough to support the alignment of pixels and light adjustment zones with such a small size.

Another approach is to apply a light adjustment panel with a low number of zones. This kind of light adjustment panel generally has less than 3,000 zones, which can be passively driven, that is, it does not contain a TFT structure, and the control electrodes of each zone are directly electrically connected to the voltage control chip, which is helpful for improving the transmittance. It can also be understood that high transmittance is the main pursuit of a light adjustment panel with a low number of light adjustment zones. Moreover, the size of each zone is relatively large, which can reach millimeter level, which has lower requirements on the alignment accuracy of pixels and light adjustment zones.

The inventors found that due to the limitation of process precision, the width of the gap between the control electrodes of the light adjustment panel with such a low number of light adjustment zones is relatively large. The electric field at the gap has edge effects, which may cause light leakage or dark areas, thereby seriously reducing the quality of the picture. The edge effect of the electric field means that the charges of the same polarity carried by the electrodes repel each other, causing the charges to be mainly concentrated at the edges of the electrode, so that the electric field at the edges of the electrode will become uneven, and the electric field lines will spread out to the surrounding. Therefore, the deflection of the liquid crystal at the edges of the control electrode would be changed.

Figure 1B:
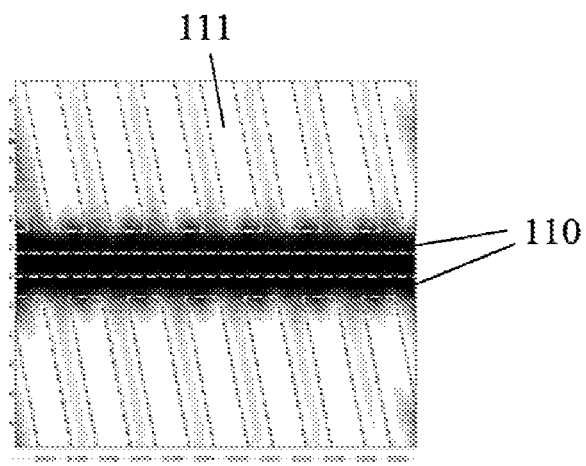

FIG. 1A and FIG. 1B schematically show the situations of the light leakage and the dark area at the gap between the control electrodes of the related light adjustment panel respectively. FIG. 1A shows that there are elongated bright areas at the gaps between the control electrodes 105 arranged in an array. FIG. 1B shows that there is a dark area between two control electrodes 110 arranged vertically. In FIG. 1B, the outline of the control electrode 110 is schematically shown with dashed lines. Two control electrodes 110 arranged vertically appear in FIG. 1B. The shape of the control electrode is a block electrode with longitudinal slits 111. As shown in FIG. 1B, there is a dark area between the control electrodes 110 adjacent along the vertical direction. These phenomena of light leakage and dark area will seriously hinder the promotion of the overlapped screen display technology.

In the related art, the light adjustment panel includes an array substrate on which the control electrodes are located and an opposite substrate disposed on the opposite side of the array substrate relative to the liquid crystal layer. In order to solve the problem of bright areas between adjacent control electrodes, one method is to set a black matrix in the opposite substrate, and align the position of the black matrix with the position of the gaps between the control electrodes to block the bright areas at the gaps. However, the inventors noticed that in actual production, the assemble process of the array substrate and the opposite substrate has a low alignment precision, so that the black matrix on the opposite substrate cannot be accurately aligned with the gaps between the control electrodes, resulting in an unsatisfactory light blocking effect.

Figure 2A:
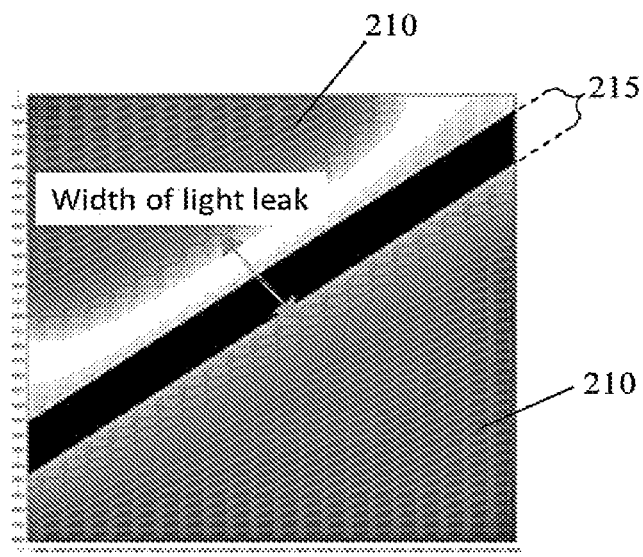
FIG. 2A and FIG. 2B schematically show the relationship between the width of the light leakage area of the light adjustment panel and the gap width between the adjacent control electrodes.
Figure 2B:
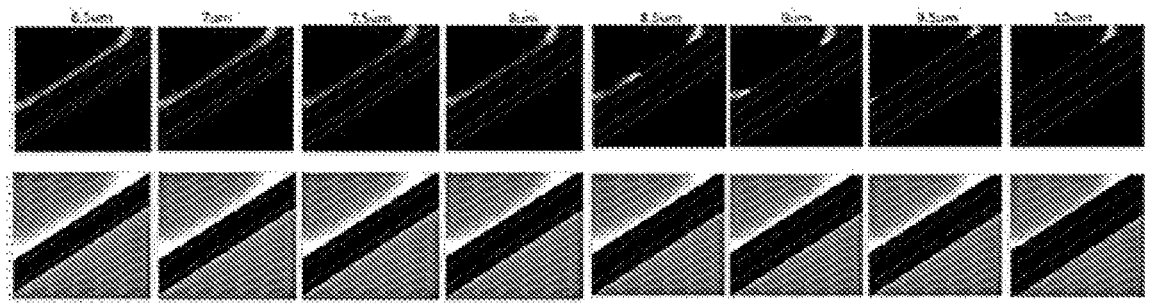

The inventors also found that the widths of the light leakage and dark area are larger than the width of the gap between the adjacent control electrodes, which can reach as much as three times of the width of the gap. The shapes of the light leakage area and the dark area and the shape of the gap between the control electrodes can be regarded as elongated strips. In the context of the present application, the term "width" denotes the dimension of such a strip shape in a direction perpendicular to its extension direction. FIG. 2A and FIG. 2B exemplarily show the relationship between the width of the light leakage area and the width of the gap 215 between the adjacent control electrodes 210 in the related art. In the example of FIG. 2A, a light blocking object whose width is equal to the width of the gap between the adjacent control electrodes is provided within the gap. However, as shown in FIG. 2A, the light blocking object does not completely cover the light leakage between adjacent control electrodes. FIG. 2B shows light leakage situations of light blocking objects with different widths. In this example, the gap between the control electrodes has a width of 3.5 μm. As shown in FIG. 2B, when the width of the light blocking object is 6.5 μm, 7 μm, 7.5 μm, 8 μm, 8.5 μm, and 9 μm, there is still a certain degree of light leakage. The light leakage does not become noticeable until the width of the light blocking object is increased to 9.5 μm or 10 μm.

Figure 3A:
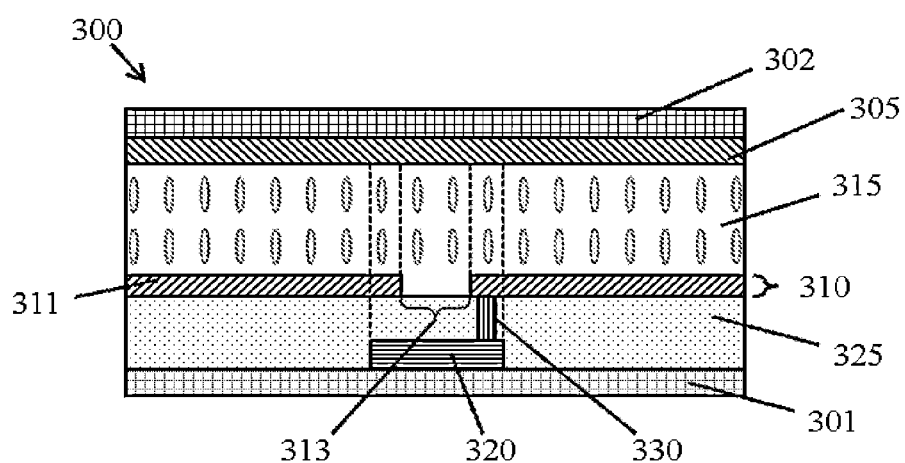
FIG. 3A schematically shows a cross-sectional view of a light adjustment panel according to an embodiment of the present application.

FIG. 3A schematically shows a cross-sectional view of a light adjustment panel according to an embodiment of the present application. As shown in FIG. 3A, the light adjustment panel 300 includes a common electrode layer 305, a control electrode layer 310, and a light adjustment liquid crystal layer 315 arranged in stack. The term "layer" refers to such a structure: among its three mutually perpendicular dimensions, a length in one dimension is significantly smaller than the length of the remaining two dimensions. The term "arranged in stack" means that a plurality of layer structures are arranged along the direction of the aforementioned dimension whose length is significantly smaller, but it is not necessarily required that the layer structures are close to each other or in contact. Furthermore, the layer structure does not require that its surface must be flat. There may also be protrusions or concaves on the surface along the aforementioned dimension whose length is significantly smaller. The term "arranged in stack" does not exclude the situation that protrusions of one layer structure are embedded in concaves of another layer structure.

It should be noted that the term "arranged in stack" does not limit the arrangement order of the layer structures. For example, in the context of "a common electrode layer 305, a control electrode layer 310, and a light adjustment liquid crystal layer 315 arranged in stack", it is not required to determine the order of the layer structures according to the order of the text, that is, the control electrode layer 310 is not required to be located between the common electrode layer 305 and light adjustment liquid crystal layer 315. In some embodiments, the light adjustment liquid crystal layer 315 is located between the common electrode layer 305 and the control electrode layer 310. In other embodiments, the common electrode layer 305 is located between the light adjustment liquid crystal layer 315 and the control electrode layer 310.

In the example of FIG. 3A, the light adjustment liquid crystal layer 315 is located between the common electrode layer 305 and the control electrode layer 310. The light adjustment panel 300 also includes a first substrate 301 and a second substrate 302. The control electrode layer 310 includes control electrodes 311 arranged in an array. As shown in FIG. 3A, there is a gap 313 between adjacent control electrodes 311. In the light adjustment panel 300, each control electrode 311 defines a zone of the light adjustment panel.

In some embodiments, the light adjustment panel 300 also includes auxiliary electrodes 320. The material of the auxiliary electrodes 320 may be metal. As shown in FIG. 3A, the orthographic projection of the gap 313 on the common electrode layer 305 is at least partially overlapped with the orthographic projection of the auxiliary electrode 320 on the common electrode layer 305. The term "at least partially overlapped" includes cases where one projection falls completely within the other projection, and also includes cases where the boundaries of two projections completely coincide, and also includes cases where a portion of one projection coincides with a portion of the other projection and the remaining parts of the two projections do not coincide. The expression that "the orthographic projection of the gap 313 on the common electrode layer 305 is at least partially overlapped with the orthographic projection of the auxiliary electrode 320 on the common electrode layer 305" can be understood as, when looking at the light adjustment panel 300 in a direction perpendicular to the common electrode layer 305, the auxiliary electrode 320 at least partially appears in the gap 313 between the control electrodes 311. The positional relationship between such an auxiliary electrode 320 and such a gap 313 can be considered to be corresponding.

Figure 4:
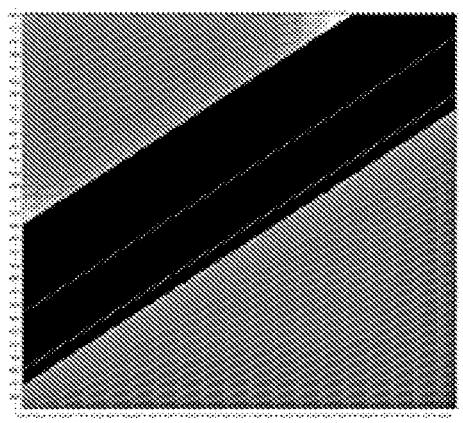
FIG. 4 schematically shows the light leakage situation of the light adjustment panel according to an embodiment of the present application.

The light adjustment panel shown in FIG. 3A, in which the light adjustment liquid crystal layer 315 is located between the common electrode layer 305 and the control electrode layer 310, is generally "always on" display. When the light adjustment liquid crystal is not driven by an electric field, it allows the light from the backlight module to pass through. At the gap 313, there is no control electrode 311, so there is no electric field formed by the common electrode layer 305 and the control electrode 311, which makes the light adjustment liquid crystal allowing the light emitted by the backlight module to pass through, causing light leakage. Moreover, at the gap 313, the edges of the control electrodes 311 may cause the formation of an edge electric field, which will further aggravate the light leakage and increase the width of the light leakage area. By providing the auxiliary electrode 320 at the position corresponding to the gap 313, the auxiliary electrode can on the one hand form an electric field with the common electrode layer 305 at the gap 313, so that the deflection of the light adjustment liquid crystal in the light adjustment liquid crystal layer 315 corresponding to the gap 313 can be controlled by the auxiliary electrode 320, and on the other hand shield the edge electric field of the control electrodes 311, so that the light passing through the gap 313 can be changed, to overcome the aforementioned light leakage problem, thereby improve the display effect. Moreover, in this embodiment, both the auxiliary electrodes 320 and the control electrodes 311 are located on the first substrate 301, that is, they are two film layers located on the same substrate, which makes the alignment accuracy of the two higher, the positional relationship between the auxiliary electrodes and the control electrodes more precise, so the electric field generated by the auxiliary electrodes can more accurately target the liquid crystal at the light leakage. FIG. 4 schematically shows the light leakage situation of the light adjustment panel according to the embodiment of the present application. As shown in FIG. 4, compared with FIG. 2, the light leakage between the control electrodes is significantly reduced, even almost completely eliminated, so the quality of the displayed image is higher.

In some embodiments, as shown in FIG. 3A, the auxiliary electrode 320 is electrically connected to one of the control electrodes 311 on both sides of the gap 313. First, this means that no special power supply components are required for the auxiliary electrode 320. Moreover, when the auxiliary electrode 320 is electrically connected to the control electrode 311, the voltage of the auxiliary electrode 320 is substantially the same as the voltage of the control electrode 311. Therefore, the voltage difference between the auxiliary electrode 320 and the common electrode layer 305 and the voltage difference between the control electrode 311 and the common electrode layer 305 are basically the same, so the electric field of the light adjustment liquid crystal corresponding to the gap 313 and the electric field of the light adjustment liquid crystal corresponding to the control electrode 311 are basically the same, the degree of deflection of the liquid crystal will be basically the same. In this way, when observing the light adjustment panel 300, the brightness at the gap 313 is basically the same as the brightness at the control electrode 311, and the gap will not appear brighter or darker.

In some embodiments, as shown in FIG. 3A, an insulating layer 325 exists between the control electrode layer 310 and the auxiliary electrode 320. The insulating layer 325 covers the auxiliary electrode 320. There is a via hole 330 in the insulating layer 325, and the auxiliary electrode 320 is electrically connected to the control electrode 310 through the conductive material in the via hole 330. In some embodiments, there is an overlapping area between the orthographic projection of the auxiliary electrode 320 on the common electrode layer 305 and the orthographic projections of the control electrodes 311 on the common electrode layer 305. The position of the via hole 330 can be set such that the orthographic projection of the via hole 330 on the common electrode layer 305 is located within the overlapping area. The way to form the electrical connection between the auxiliary electrode 320 and the control electrode 311 may be to provide an insulating layer 325 on the auxiliary electrode 320t, and then perform an etching operation on the insulating layer 325 to form a via hole 330 therein. The via hole 330 should reach the auxiliary electrode 320. In order to ensure the effect of electrical connection, the insulating layer 325 can be over-etched, that is, in the process of forming the via hole 330, the surface of the auxiliary electrode 320 in the via hole 330 is also etched to a certain degree to ensure that no insulating material remains on the surface of the auxiliary electrode 320 inside the via hole. A control electrode material is then deposited on the insulating layer. Part of the control electrode material will enter the via hole 330 and reach the auxiliary electrode 320 to play a conductive role. Then, the material of the control electrode is etched to obtain the control electrode 311. After this operation, the control electrode 311 is electrically connected to the auxiliary electrode 320 through the control electrode material.

Figure 3B:
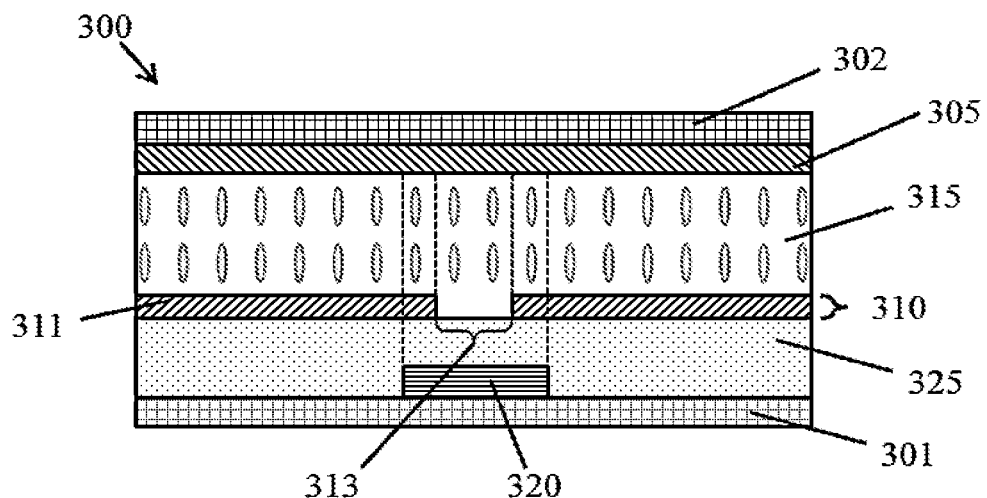
FIG. 3B schematically shows a cross-sectional view of a light adjustment panel according to an embodiment of the present application.

FIG. 3B schematically shows a cross-sectional view of a light adjustment panel according to another embodiment of the present application. The auxiliary electrode 320 itself is not absolutely transparent, and may even be opaque (for example, when the material of the auxiliary electrode is metal). Therefore, as long as the auxiliary electrode is arranged at the gap between the control electrodes, the auxiliary electrode can achieve a certain light blocking effect, thereby reducing the aforementioned light leakage problem. In some embodiments, as shown in FIG. 3B, the auxiliary electrode 320 is not electrically connected to other components in the light adjustment panel, that is, the auxiliary electrode 320 may not be powered. In this case, a certain light blocking effect can be achieved, and there is no need to provide a corresponding power supply circuit for the auxiliary electrode 320, which is beneficial for simplifying the structure of the light adjustment panel and reducing the complexity of the manufacturing process of the light adjustment panel. It should be understood that in other embodiments of the present application described below, unless otherwise specified, the auxiliary electrode 320 may be configured to be electrically connected to other components in the light adjustment panel, or may be configured not to be electrically connected to other components.

Figure 5:
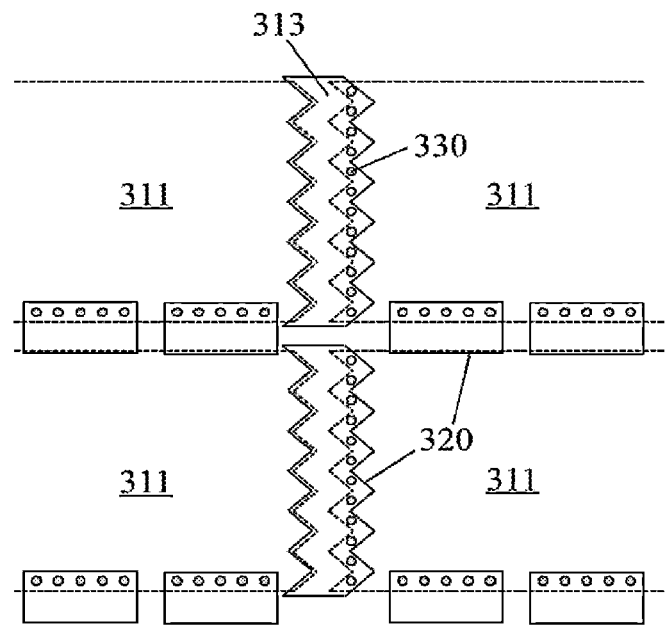
FIG. 5 schematically shows a top view of a light adjustment panel according to an embodiment of the present application.

FIG. 5 schematically shows a top view of the light adjustment panel according to an embodiment of the present application, which specifically shows the positional relationship of the components in the light adjustment panel 300 when looking at the light adjustment panel 300 along a direction perpendicular to the common electrode layer 305. As shown in FIG. 5, the orthographic projections of the control electrodes 311 partially overlap with the orthographic projection of the auxiliary electrode 320. The orthographic projection of the via hole 330 is located at the overlapping area of the orthographic projection of the control electrode 311 and the orthographic projection of the auxiliary electrode 320. It should be understood that in the aforementioned case where the auxiliary electrode is not electrically connected to other components in the light adjustment panel, there is no need to provide the via hole 330 for the auxiliary electrode 320

As mentioned above, high transmittance is the main pursuit of light adjustment panels with low number of zones, so it is hoped to reduce the influence of auxiliary electrodes on transmittance. The inventor has found through experiments that the light leakage between the control electrodes tends to be biased towards the weak alignment region of the liquid crystal. The weak alignment region is generated because, in the actual manufacturing process of the liquid crystal panel, components at various locations on the surface of the array substrate are different, and the heights of the components are also different. For example, since the auxiliary electrodes have a certain thickness and the auxiliary electrodes are arranged at the gaps between the control electrodes, the height at the gaps between the control electrodes may be higher than the height at the control electrodes. In this way, the alignment layer is not flatly coated on the surface of the array substrate, but there are level differences. When rubbing the alignment layer with a rubbing roller, the roller goes through uphill and downhill processes. For example, a roller experiences uphill when it reaches the gap between the control electrodes, and experiences downhill when it leaves the gap between the control electrodes. When going downhill, the contact between the roller and the film surface of the alignment layer is weak, resulting in weak alignment force, thus forming a weak alignment region. The anchoring energy of the liquid crystal in the weak alignment region is weaker, and is more easily disturbed by electric field, and is more prone to alignment disorders, so the light leakage of the weak alignment region will be more serious.

Figure 6:
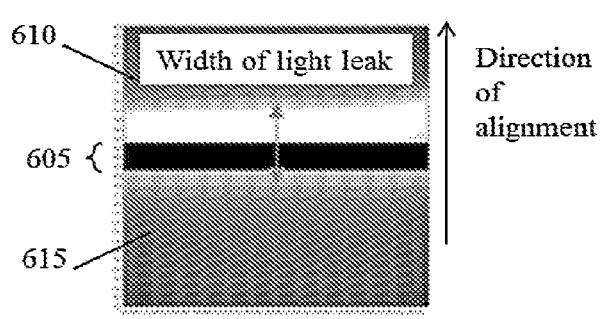
FIG. 6 schematically shows the relationship between the alignment direction of the light adjustment panel and the position of the light leakage region.

FIG. 6 schematically shows the relationship between the alignment direction and the position of the light leakage region. The liquid crystal panel in FIG. 6 is aligned along the direction of the arrow in the figure (from bottom to top). In the direction shown in FIG. 6, the light leakage area is biased above the gap 605 between the control electrodes in the figure, because when the roller passes here, it is leaving the gap 605 between the control electrode 610 and the control electrode 615, towards the control electrode 610, that is, going downhill. In some embodiments of the present application, the auxiliary electrodes are set closer to the side where the weak alignment region is located. Compared with the situation where the midline of the auxiliary electrode is aligned with the midline of the gap between the control electrodes, the auxiliary electrode needs a narrower width to achieve the same light blocking effect, so it is beneficial to the transmittance of the panel. That is to say, these embodiments achieve a better light blocking effect with a narrower width.

Figure 7A:
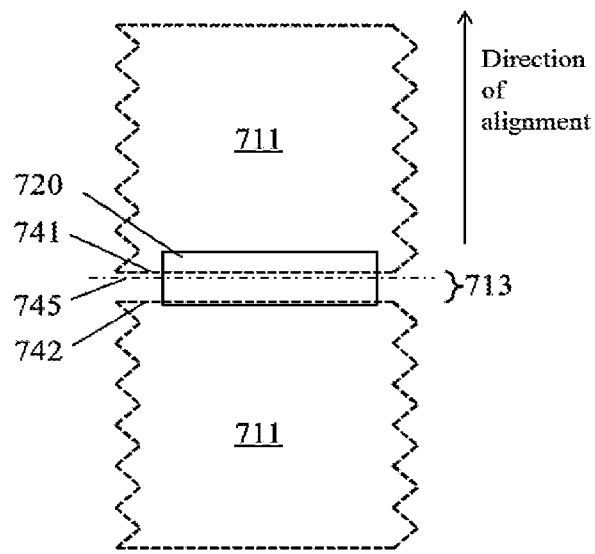
FIG. 7A and FIG. 7B schematically show a top view and a cross-sectional view of a light adjustment panel according to an embodiment of the present application, respectively.
Figure 7B:
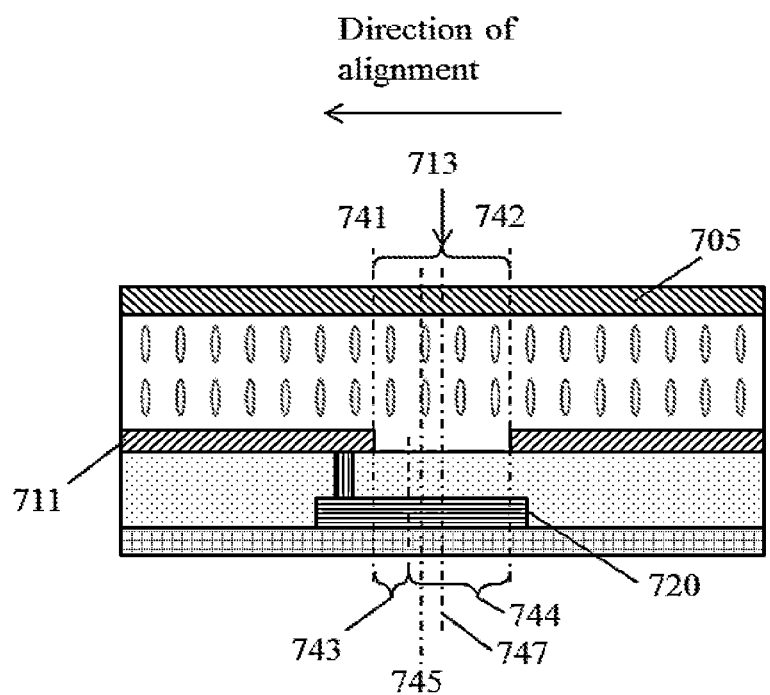

FIG. 7A and FIG. 7B schematically show a top view and a cross-sectional view of a light adjustment panel according to an embodiment of the present application. As shown in FIG. 7A and FIG. 7B, the gap 713 between the control electrodes 711 includes a first boundary 741, a second boundary 742, a weak alignment region 743 and a non-weak alignment region 744. The weak alignment region 743 is closer to the first boundary 741 than the non-weak alignment region 744. The non-weak alignment region 744 is closer to the second boundary 742 than the weak alignment region 743. The light adjustment liquid crystal layer includes first light adjustment liquid crystal and second light adjustment liquid crystal. The orthographic projection of the first light adjustment liquid crystal on the gap is located in the weak alignment region. That is, the location of the first light adjustment liquid crystal corresponds to the weak alignment region. The orthographic projection of the second light adjustment liquid crystal on the gap is located in the non-weak alignment region. That is, the location of the second light adjustment liquid crystal corresponds to the non-weak alignment region. Therefore, the average anchoring energy of the first light adjustment liquid crystal is smaller than the average anchoring energy of the second light adjustment liquid crystal. The term "average anchoring energy of first light adjustment liquid crystal" should be understood as the average value of the anchoring energy of each liquid crystal molecule whose position corresponds to the weak alignment region. The term "average anchoring energy of second light adjustment liquid crystal" should be understood as the average value of the anchoring energy of each liquid crystal molecule whose position corresponds to the non-weak alignment region.

The orthographic projection of the first boundary 741 on the auxiliary electrode 720 is closer to the midline 745 of the auxiliary electrode 720 than the orthographic projection of the second boundary on the auxiliary electrode 720. This can be understood as that the midline of the auxiliary electrode 720 is closer to the first boundary 741. This means that the auxiliary electrode 720 is closer to the first boundary 741. The weak alignment region 743 is closer to the first boundary 741 than the non-weak alignment region 744, indicating that the side where the first boundary 741 is located is the weak alignment side of the gap 713. The anchoring energy of the liquid crystal on this side is weak, and the light leakage phenomenon mainly occurs on this side. By setting the auxiliary electrode 720 closer to the weak alignment side, the auxiliary electrode 720 can more effectively control the liquid crystal molecules in the weak alignment region, making the control of light leakage more specific. Moreover, on the premise of achieving the same light blocking effect, compared with the scheme of aligning the midline of the auxiliary electrode and the midline of the gap of the control electrodes, this can make the required width of the auxiliary electrode narrower, which is beneficial to the transmittance of the light adjustment panel.

In some embodiments, the distance between the orthographic projection of the midline 745 of the auxiliary electrode 720 on the common electrode layer 705 and the orthographic projections of the midline 747 of the gap 713 between the control electrodes 711 on the common electrode layer is in the range of 0.5 µm to 1.5 µm. The electric field generated by the auxiliary electrode whose position meets this requirement is closer to the position of the light leakage area, which not only effectively reduces the light leakage phenomenon, but also reduces the required width. For example, in the case of the midline of the auxiliary electrode being align with the midline of the gap between the control electrodes, in order to completely prevent light leakage, the width of the auxiliary electrode needs to reach 11 µm, while when the auxiliary electrode is closer to the weak alignment side of the gap, the auxiliary electrode only needs a width of 9 µm. It has been verified by experiments that the transmittance of the latter is 15% to 20% higher than that of the former.

The inventors also realized that in a light adjustment panel with a low number of zones, since the size of each individual zone is large, the gap between the auxiliary electrodes is large. The design of the light adjustment panel needs to be considered in combination with indicators such as the number of zones and the resolution of the display panel. Taking an overlapped screen panel with a diagonal length of 15.6 inches as an example, if the resolution of the display panel (i.e., the main cell) is required to be 3840×2160, the corresponding pixel size is 90 µm×90 µm. If the number of light adjustment zones in the light adjustment panel (that is, the sub cell) is selected to be about 1200, the zones in the light adjustment panel can be set to 48×27 (a total of 1296 zones). In this example, each zone contains 80×80 pixels (total 6400 pixels), and the size of the zones is about 7.2 mm×7.2 mm. The auxiliary electrodes are arranged in the gaps between the control electrodes, that is, the distance between adjacent auxiliary electrodes is the width of one zone, which is 7.2 mm. When the distance between adjacent auxiliary electrodes is such large, the auxiliary electrodes are recognizable for the human eyes.

Figure 8:
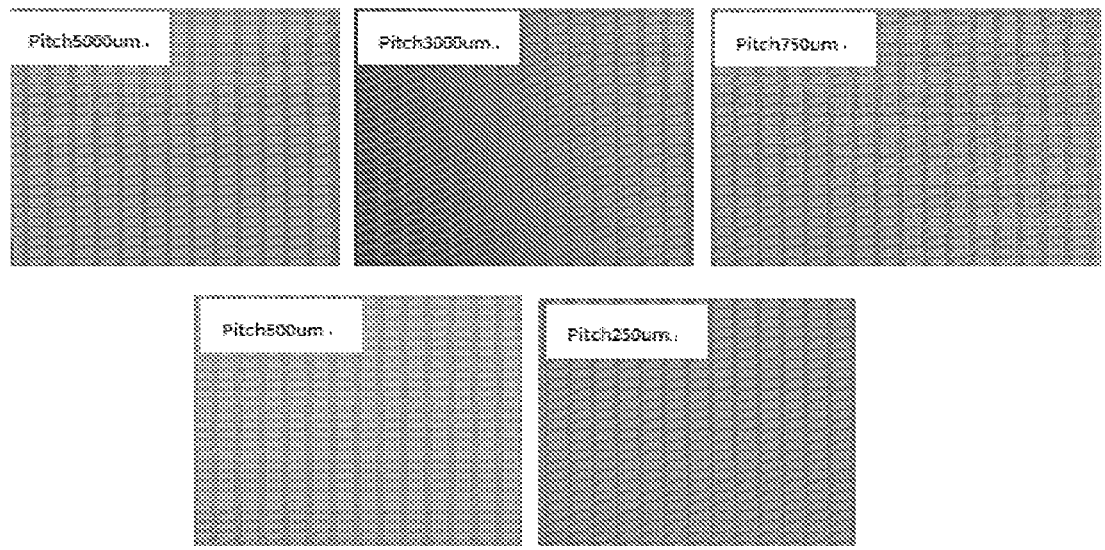
FIG. 8 schematically shows the relationship between the spacing between the elongated strip-shaped structures and the distinguishability of such strip structures.

FIG. 8 shows the relationship between the pitch of the elongated strip structures and whether they are recognizable. Specifically, FIG. 8 schematically shows the viewing effects of human eyes when the pitches of the strip structures of 6 µm width are 250 µm, 500 µm, 750 µm, 3000 µm and 5000 µm respectively. As shown in FIG. 8, when the pitch is wide (for example, 750 µm, 3000 µm or 5000 µm), even if the strip structure is only 6 µm wide, it can still be recognized by human eyes. When the pitch is less than 500 µm, it will be difficult for human eyes to recognize. When the pitch is reduced to 250 µm, the human eye will not be able to distinguish dark lines.

It should also be noted that the resolution ability of the human eyes is also related to the distance between the human eyes and the display device. Table 1 below shows the relationship between different viewing distances and the pitches of the strip structures.

TABLE 1

Relationship between different viewing distances and strip structure pitch.

| | Laptop Computer | Desktop Computer | Television |
|---|---|---|---|
| Viewing distance (cm) | 30~50 | 50~70 | 300~350 |
| Strip structure pitch (µm) | <250~280 | <450~550 | <5000 |

As shown in Table 1, when the viewing distance is between 30 cm and 50 cm (such as the usage scenario of a laptop computer), the minimum pitch that can be recognized by human eyes is between 250 μm and 280 μm. That is, when the pitch of the stripe structures is less than 250 μm, it cannot be recognized by human eyes. Similarly, when the viewing distance is between 50 cm and 70 cm (such as the usage scenario of a desktop computer), the minimum pitch that can be recognized by human eyes is between 450 μm and 550 μm. When the viewing distance is between 300 cm and 350 cm (such as the use scenario of a television), when the pitch of the strip structures is less than 5000 μm, it cannot be recognized by human eyes. It can be seen that as the viewing distance increases, the allowable pitch of the strip structures can also be larger. Different products can choose different pitches to achieve high-quality display effects.

To sum up, in a light adjustment panel with a low number of zones, the auxiliary electrodes arranged at the gaps between the control electrodes may be recognized by human eyes. This affects the display effect of the overlapped screen panel.

However, the inventor noticed that a light adjustment panel with a low number of zones can be passively driven, wherein each control electrode is connected to a corresponding gate line. The gate line is used to connect the control electrode and the voltage control chip to transmit the control signal sent by the voltage control chip to the control electrode. The specific layout form of the gate lines can be, when N zones are arranged in a column (N is a natural number), N gate lines are arranged along the column direction in the column zones in parallel and are spaced from each other, and each gate line will be electrically connected to a corresponding control electrode. The gate lines are very close to each other, so they cannot be seen due to the limited resolution of the human eye. Therefore, in some embodiments, the gate lines can be arranged parallel to the auxiliary electrode and spaced apart from the auxiliary electrode. The auxiliary electrode and the gate line can have similar widths, and the auxiliary electrodes and the gate lines arranged in parallel and spaced from each other can be visually mixed together, and the distance between any adjacent two of them is smaller than the minimum distance that can be distinguished by human eyes. In this situation, the control electrodes and the gate lines cannot be distinguished by human eyes.

Figure 9:
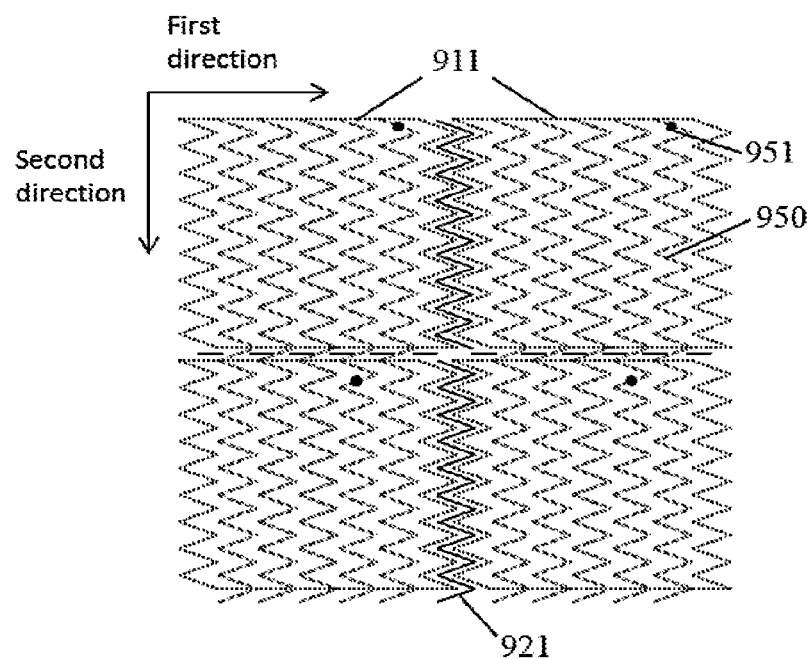
FIG. 9 schematically shows a top view of a light adjustment panel according to an embodiment of the present application.
Figure 10:
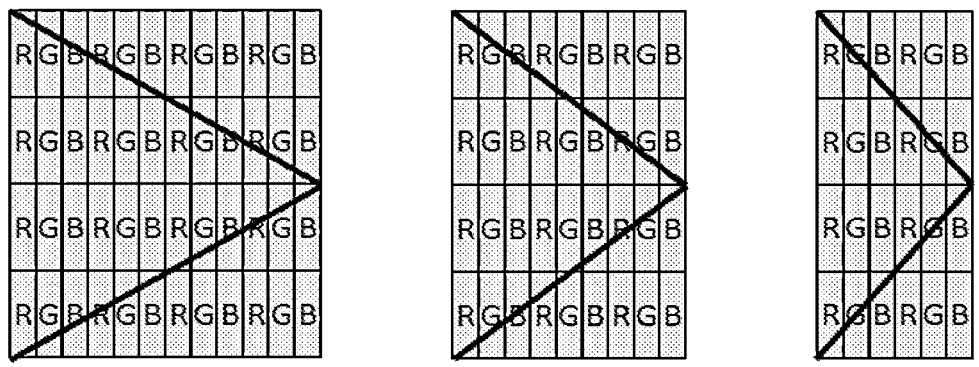
FIG. 10 schematically shows the relationship between the bending of the gate lines of the light adjustment panel and the pixels of the display panel.

FIG. 9 schematically shows a top view of a light adjustment panel according to an embodiment of the present application. As shown in FIG. 9, in the light adjustment panel according to the embodiment of the present application, the control electrodes 911 arranged in an array are arranged along the first direction and the second direction. The first direction is at an angle to the second direction. For example, first direction can be perpendicular to the second direction. The light adjustment panel also includes the gate line layer. The gate line layer includes gate lines 950. Each of the gate lines 950 are electrically connected to a corresponding one of the control electrodes 911. For example, the gate line 950 can be electrically connected to the corresponding control electrode 911 through the conductive material in the via hole 951. The gate line 950 extends along the first direction. It should be noted that the term "extending in a certain direction" is a consideration of the macroscopic extending trend. Small fluctuations in directions other than the macroscopic extending trend do not affect the determination of the direction of extension. For example, as shown in FIG. 9, although there are bends in the gate lines 950, the bends are reciprocating. The extent of the bends, such as the traveled distance in the second direction, is much smaller than the traveled distance in the first direction. Therefore, it can be considered macroscopically that the gate lines 950 extend along the first direction. The reason why the gate lines are bent is to reduce the moire phenomenon that occurs when the light adjustment panel and the display panel are combined. FIG. 10 schematically shows the relationship between the bends of the gate lines of the light adjustment panel and the pixels of the display panel. In the display panel, one pixel may include a red sub-pixel R, a green sub-pixel G, and a blue sub-pixel B. Referring to the simulation and experimental results, the gate line can be configured to bend whenever it crosses four pixels in the first direction and two pixels in the second direction (as shown in the left part of FIG. 10), or the gate line can be configured to bend whenever it crosses three pixels in the first direction and two pixels in the second direction (as shown in the middle part of FIG. 10), or the gate line can be configured to bent whenever it crosses two pixels in the first direction and two pixels in the second direction (as shown in the right part of FIG. 10). This setup significantly reduces moire.

In some embodiments, the auxiliary electrodes includes first auxiliary electrodes 921 extending along the first direction. The orthographic projections of the first auxiliary electrodes 921 and the gate lines 950 on the common electrode layer are arranged in parallel and spaced apart from each other. By arranging the gate lines 950 and the first auxiliary electrodes 921 in this way, the gate lines 950 and the first auxiliary electrodes 921 are mixed together. The distance between the first auxiliary electrode 921 and its nearest gate line 950 may be small enough to be indistinguishable by the human eyes. When the human eyes look at the light adjustment panel, they will not see the black lines along the first direction.

For example, in the aforementioned 15.6-inch overlapped screen panel, there are 27 gate lines inside each column of control electrodes, and the width of the control electrodes is about 7.2 μm. Therefore, the pitch of the gate lines is about 257 μm. The first auxiliary electrodes 921 and the gate lines 950 are mixed together. The distance between the first auxiliary electrode 921 and its nearest gate line 950 is also on the order of 250 μm, which is lower than the minimum distance that can be distinguished by human eyes, so it will not be recognized by human eyes.

In some embodiments, the distance between any two adjacent orthographic projections of the orthographic projections of the first auxiliary electrodes and the gate lines on the common electrode layer is the same. In this case, the mixing of the first auxiliary electrodes and the gate lines is uniform. The distance between the first auxiliary electrode and its adjacent gate line is the same as the distance between any two adjacent gate lines. This makes the first auxiliary electrode less visible.

The gate lines extend along the first direction, therefore, the first auxiliary electrodes extending along the first direction may not be observed. However, the auxiliary electrodes also include second auxiliary electrodes extending along the second direction. The distance between adjacent second auxiliary electrodes is the size of the control electrode in the second direction, this distance is relatively large, and there is no gate line in this direction. When viewing the light adjustment panel, especially when the panel displays white, black lines extending in the second direction may appear. Therefore, in some embodiments, the wires extending along the second direction may be added, so that the density of the wires and the second auxiliary electrodes exceeds the recognition range of human eyes.

Figure 11:
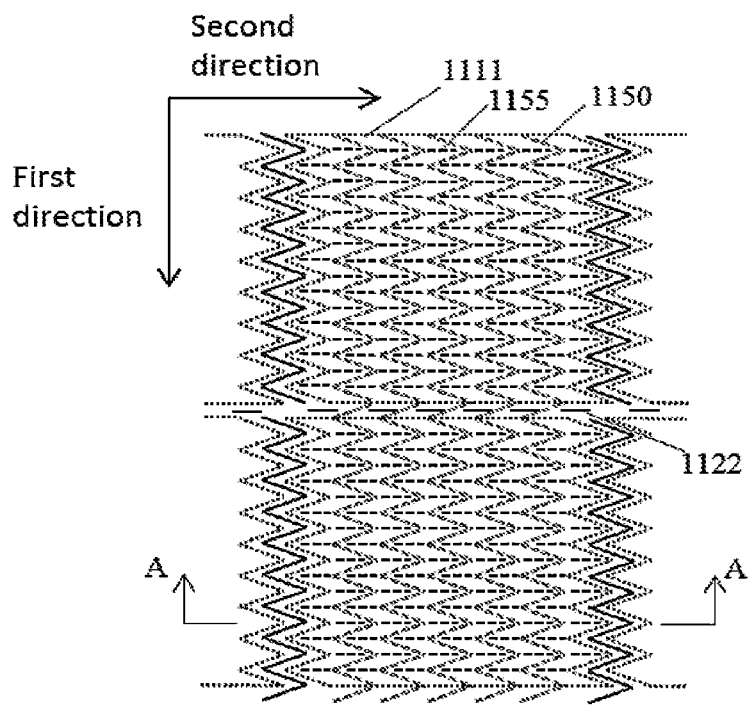
FIG. 11 schematically shows a top view of a light adjustment panel according to an embodiment of the present application.

FIG. 11 schematically shows a top view of a light adjustment panel according to an embodiment of the present application. As shown in FIG. 11, the light adjustment panel further includes dummy wires 1155. The dummy wires 1155 extend along the second direction. The auxiliary electrodes further include second auxiliary electrodes 1122 extending along the second direction. The orthographic projection of the dummy wires 1155 and the second auxiliary electrodes 1122 on the common electrode layer are arranged in parallel and spaced from each other. By adding dummy wires 1155 in the light adjustment zones, the second auxiliary electrodes 1122 can be mixed with the dummy wires 1155, so that the human eyes cannot distinguish a single second auxiliary electrode 1122 or a single dummy wire 1155. That is, the human eyes cannot see the light blocking effect of the second auxiliary electrodes 1122 and the dummy wires 1155. Therefore, by adding the dummy wires 1155 extending along the second direction and controlling their density, the light leakage between the control electrodes 1111 arranged along the first direction can be effectively improved.

In some embodiments, the gate lines 1150 are bent at inflection points, and the orthographic projections of the straight lines where the dummy wires 1155 are located on the gate line layer pass through the inflection points. It can be seen from the example of the relationship between the gate lines and the pixels depicted in FIG. 10 that the inflection points of the gate lines generally appear at the gaps between the pixels. In the display panel, a black matrix is generally set at the gaps between the pixels. Therefore, by setting the position of the dummy wires 1155 so that the orthographic projections of the straight lines where the dummy wires 1155 are located on the gate line layer pass through the inflection points, the dummy wires 1155 and the black matrix of the display panel may at least partially overlap, so that the existence of the dummy wires 1155 does not affect the display function of the pixels of the display panel, and will not be significantly reduce the overall transmittance of the overlapped panel.

It should be noted that both the gate lines and the auxiliary electrodes are powered. The dummy wires are located between adjacent gate lines and between the gate line and the first auxiliary electrode. Therefore the dummy wires are segmented and they should not short-circuit the adjacent gate line, nor should they short-circuit the gate line and the first auxiliary electrode.

Figure 12:
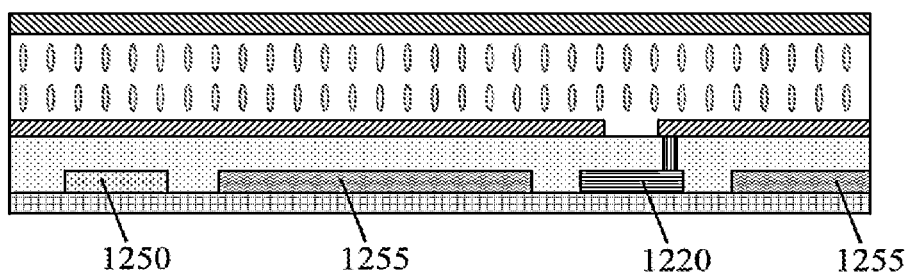
FIG. 12 schematically shows a cross-sectional view of a light adjustment panel according to an embodiment of the present application.

In some embodiments, at least two of the dummy wires, the gate lines, and the auxiliary electrodes are located on the same layer. FIG. 12 schematically shows a cross-sectional view of a light adjustment panel according to an embodiment of the present application. FIG. 12 is a partial view of a cross-sectional view along AA direction in FIG. 11. As shown in FIG. 12, the auxiliary electrodes 1220, the dummy wires 1255, and the gate lines 1250 may be arranged on the same layer. In this case, by selecting a same material for the three, such as metal, the three can be formed in the same step. For example, the metal material layer can be etched by using only one mask, so as to simultaneously form the patterns of auxiliary electrodes 1220, dummy wires 1255, and gate lines 1250 in one exposure and etching process. This reduces the number of process and requires only one mask, thus saving costs.

Figure 13:
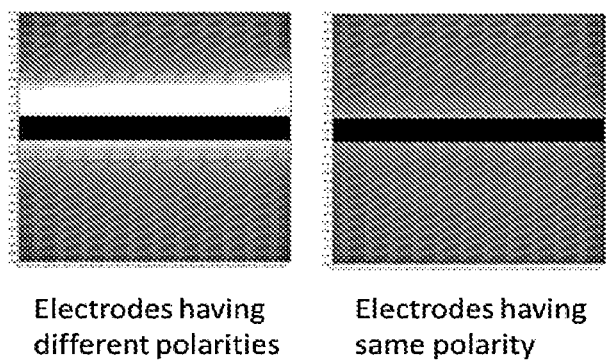
FIG. 13 schematically shows the relationship between the polarities of adjacent control electrodes in the light adjustment panel and the light leakage situation of the gap between the control electrodes.

The inventors also found that by setting the polarities of adjacent control electrodes to the same voltage polarity, for example, making the two control electrodes positive or negative, the width of the light leakage region can be reduced. When the voltage polarities of adjacent control electrodes are opposite, the voltage difference between adjacent control electrodes is larger, which results in a larger width of the light leakage region. FIG. 13 schematically shows the relationship between the polarities of adjacent control electrodes in the light adjustment panel and the light leakage of gap between the control electrodes. In the experiment in FIG. 13, the width of the gap between adjacent control electrodes is 3.5 μm. The left of FIG. 13 shows the light leakage situation when the voltage polarities of adjacent control electrodes are opposite. It can be seen that, in this situation, the light leakage phenomenon is obvious. The experimental result is that the light leakage width can reach 10 μm. The right of FIG. 13 shows the light leakage situation when the voltage polarities of adjacent control electrodes are the same. It can be seen that in this situation, the degree of light leakage is obviously slight. The experimental result is that the light leakage width is within 6 μm.

Figure 14:
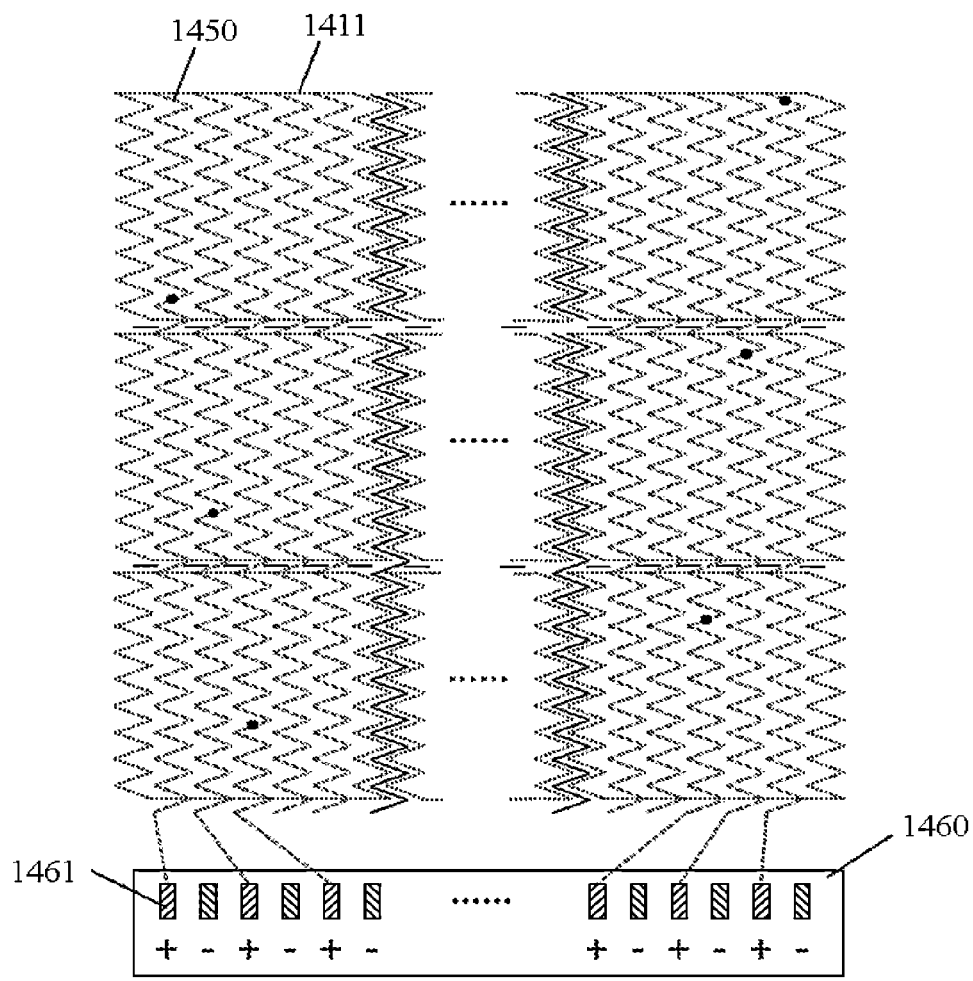
FIG. 14 schematically shows a top view of a light adjustment panel according to an embodiment of the present application.

In the light adjustment panel, the voltage of the control electrode is controlled by the voltage control chip. FIG. 14 schematically shows a top view of a light adjustment panel according to an embodiment of the present application. In some embodiments, the light adjustment panel further includes a voltage control chip 1460. The voltage control chip 1460 includes output pins 1461. The voltage control chip 1460 is configured to be connected to the gate lines 1450 through the output pins 1461, and connected to the control electrodes 1411 through the gate lines 1450, so as to control the voltages of the control electrodes 1411. As shown in FIG. 14, the control electrodes 1411 are connected to output pins 1461 with the same voltage polarity. For example, in the light adjustment panel shown in FIG. 14, all control electrodes 1411 are connected to output pins 1461 with a positive voltage polarity through gate lines 1450. Through this setting, the polarities of all control electrodes 1411 in the light adjustment panel can be made the same. In this way, the voltage difference between the control electrodes will be reduced, and the influence range of the edge electric field will also be reduced. Correspondingly, the width of the light leakage area is also reduced, which improves the display effect. Moreover, the range of the electric field that needs to be provided by the auxiliary electrodes is also reduced, so the width of the auxiliary electrodes can also be reduced, which is beneficial to the transmittance of the panel.

Sometimes, when designing a light adjustment panel, the selection of the voltage control chip is already determined. The output pins of the voltage control chip can be preset so that adjacent pins have different voltage polarities, as shown in FIG. 14. In this case, in some embodiments, the gate line can be selectively connected to the output pins in order to achieve the same polarities of the control electrodes. For example, the gate lines are all connected to the positive polarity pins or to the negative polarity pins. In this way, although the output pins of the opposite polarity will be vacant, resulting in a certain degree of waste, there is no need to re-select the voltage control chip, which is beneficial to the continuity of the process.

As mentioned above, in some embodiments, the light adjustment liquid crystal layer 315 is located between the common electrode layer 305 and the control electrode layer 310. In some other embodiments of the present application, the common electrode layer may be located between the light adjustment liquid crystal layer and the control electrode layer. Such embodiments are described below.

Figure 15A:
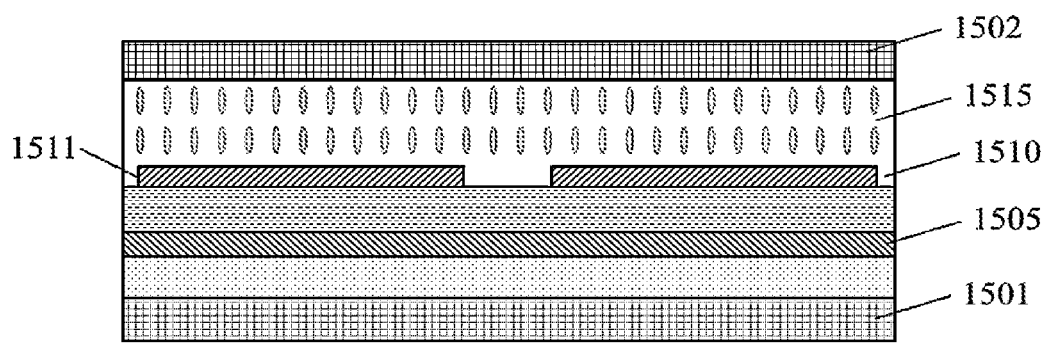
FIG. 15A and FIG. 15B schematically show a cross-sectional view and a top view of a related light adjustment panel, respectively.
Figure 15B:
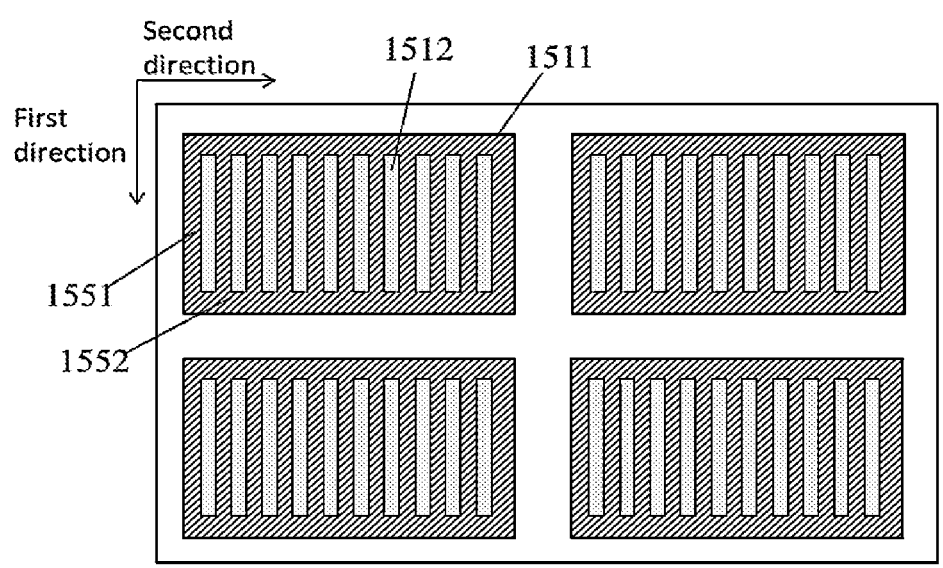

FIG. 15A and FIG. 15B schematically show a cross-sectional view and a top view of a related light adjustment panel. As shown in FIG. 15A, the light adjustment panel includes a first substrate 1501 and a second substrate 1502. The light adjustment panel also includes a common electrode layer 1505, a control electrode layer 1510, and a light adjustment liquid crystal layer 1515. An insulating layer exists between the first substrate 1501 and the common electrode layer 1505. The control electrode layer 1510 is sandwiched between the light adjustment liquid crystal layer 1515 and the common electrode layer 1505. In other words, the common electrode layer 1505 and the control electrode layer 1510 are located on the same side of the light adjustment liquid crystal layer 1515. In this structure, the common electrode layer 1505 and the control electrode layer 1510 form a horizontal electric field in the light adjustment liquid crystal layer 1515 to drive the liquid crystal to deflect. The control electrode layer 1510 includes the control electrodes 1511. An edge electric field is generated at the edges of the control electrodes 1511.

The light adjustment panel where the common electrode layer 1505 and the control electrode layer 1510 are located on the same side of the light adjustment liquid crystal layer 1515 is generally an always off panel. When the light adjustment liquid crystal is not driven by an electric field, it will prevent the light of the backlight module from passing through. As shown in FIG. 15B, slits 1512 are formed in the control electrodes 1511, such that the electric field lines originate from the control electrodes 1511 that are closer to the light adjustment liquid crystal layer 1515, extend to the light adjustment liquid crystal layer 1515, and then extend in the opposite direction until reaching the common electrode layer 1505 that is farther away from the light adjustment liquid crystal layer 1515. It can also be understood as that the control electrode 1511 includes a plurality of first component electrodes 1551 extending along the first direction and second component electrodes 1552 extending along the second direction. The first direction and second direction are angled. In this application, unless explicitly stated otherwise, first direction and second direction may or may not be perpendicular. The direction of the electric field formed by the second component electrode 1552 and the common electrode layer 1505 is parallel to the direction of the liquid crystal (for example, the direction of the long axis of the liquid crystal molecule), and the nearby liquid crystal cannot be driven at this time. Therefore, the liquid crystal molecules near the gap between the two adjacent control electrodes 1511 arranged along the first direction will not be deflected, and a dark area will appear in this area. FIG. 1B of the present application has schematically shown the dark area at the gap between two adjacent control electrodes arranged along the first direction in a related light adjustment panel. The gap between the control electrodes of the light adjustment panel has a width of 3.5 µm, while the width of the dark area can reach 15 µm.

It should be understood that the direction of the long axis of the liquid crystal molecules is determined by the alignment films on both sides of the liquid crystal layer. In this light adjustment panel, the long axis direction of the liquid crystal molecules is the first direction.

Figure 16:
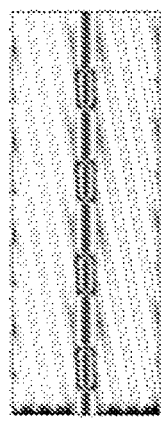
FIG. 16 schematically shows the situation of the dark area between adjacent control electrodes in a light adjustment panel.

The direction of the electric field formed by the first component electrode 1551 and the common electrode layer 1505 is perpendicular to the direction of the liquid crystal, which can drive nearby liquid crystals. However, as affected by the edge effect, there is still a dark area at the gap between two adjacent control electrodes 1511 arranged in the second direction. FIG. 16 schematically shows the dark area between two adjacent control electrodes arranged in the second direction in the light adjustment panel.

Figure 17A:
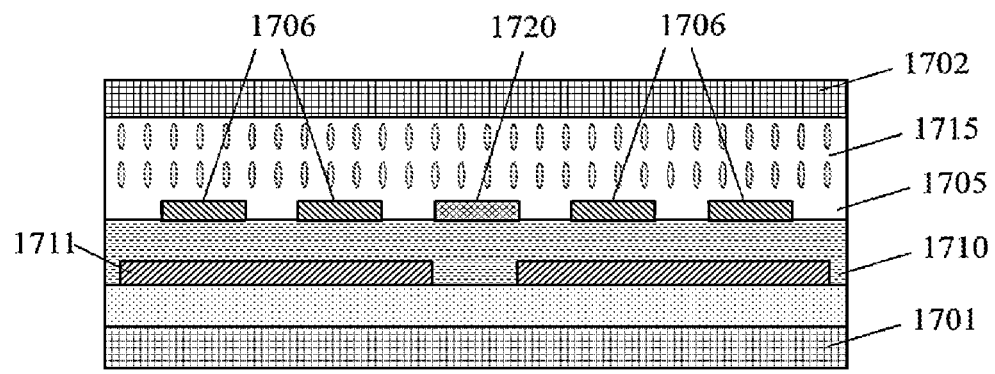
FIG. 17A and FIG. 17B schematically show a cross-sectional view and a top view of a light adjustment panel according to an embodiment of the present application, respectively.
Figure 17B:
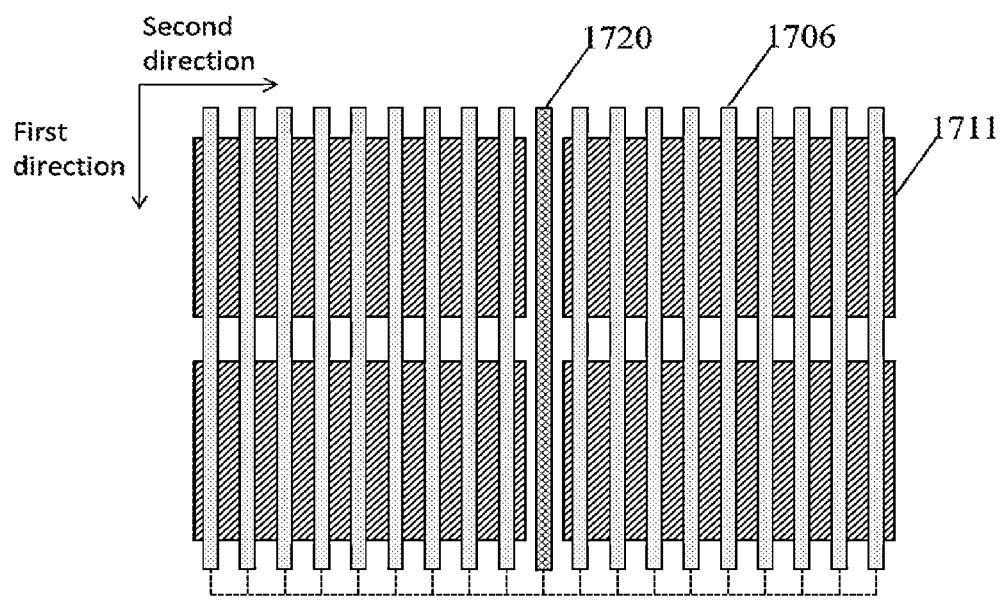

FIG. 17A schematically shows a cross-sectional view of a light adjustment panel according to an embodiment of the present application. FIG. 17B schematically shows a top view of a light adjustment panel according to an embodiment of the present application. As shown in FIG. 17A, the common electrode layer 1705 is sandwiched between the light adjustment liquid crystal layer 1715 and the control electrode layer 1710. That is, the common electrode layer 1705 and the control electrode layer 1710 are located on the same side of the light adjustment liquid crystal layer 1715, and the common electrode layer 1705 is closer to the light adjustment liquid crystal layer 1715 than the control electrode layer 1710.

As shown in FIG. 17B, the common electrode layer 1705 includes parallel strip electrodes 1706, the auxiliary electrodes 1720 are located in the common electrode layer 1705, and is parallel to and electrically connected to the strip electrodes 1706. Since the auxiliary electrode 1720 is located in the common electrode layer 1705, the auxiliary electrodes and the strip electrodes of the common electrode layer can be formed simultaneously in one process step using one mask. This reduces the number of processes and also saves costs. The auxiliary electrodes 1720 and the strip electrodes 1706 can be electrically connected in a suitable manner, as shown by the dotted line in FIG. 17B. For example, wires are provided between the auxiliary electrodes 1720 and the strip electrodes 1706 at a place that does not overlap with the control electrodes 1711, so that the wires can form electrical connections between the auxiliary electrodes 1720 and the strip electrodes 1706 without forming an electric field with the control electrodes 1711 which affects the deflection of light adjustment liquid crystal. It should be understood that the potentials of the strip electrodes 1706 in the common electrode layer 1705 are the same, therefore, in some embodiments, the strip electrodes 1706 are also electrically connected, as shown by the dotted line in FIG. 17B. In a further embodiment, the strip electrodes 1706 and the auxiliary electrodes 1720 can be obtained by removing multiple parallel slits in the conductive material layer. In such an embodiment, the top ends and bottom ends of the strip electrodes 1706 and the auxiliary electrodes 1720 are respectively connected by conductive material, that is, the electrical connection between the strip electrodes 1706 and the auxiliary electrodes 1720 are realized.

Figure 18:
FIG. 18 schematically shows the situation of a dark area between adjacent control electrodes in a light adjustment panel provided with auxiliary electrodes.

The orthographic projection of the gap between the control electrodes 1711 on the common electrode layer 1705 is at least partially overlapped with the orthographic projection of the auxiliary electrode 1720 on the common electrode layer 1705, that is, the auxiliary electrode 1720 is arranged to correspond to the edge of the control electrode 1711. Since the auxiliary electrode 1720 is electrically connected to the strip electrode 1706, the auxiliary electrode 1720 can play a role of shielding and reduce the edge effect. FIG. 18 shows the dark area between two adjacent control electrodes arranged in the second direction after the auxiliary electrode is provided at the position corresponding to the gap between the control electrodes of the light adjustment panel in FIG. 16. As shown in FIG. 18, compared to FIG. 16, the situation of the dark area has been greatly modified.

Figure 19A:
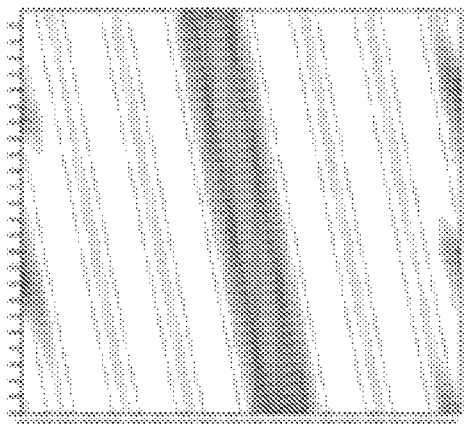
FIG. 19A and FIG. 19B schematically show the white display effect of the light adjustment panel without auxiliary electrodes and the light adjustment panel with auxiliary electrodes, respectively.
Figure 19B:
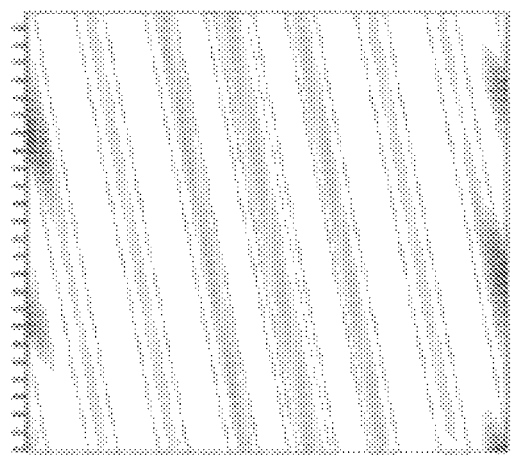
Figure 20A:
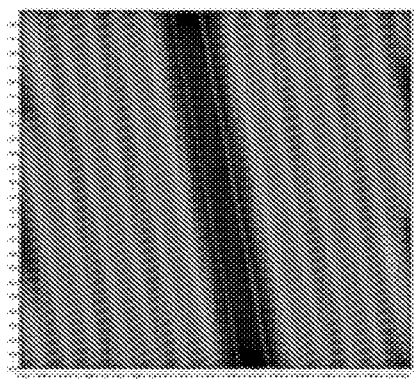
FIG. 20A and FIG. 20B schematically show the gray scale display effect of the light adjustment panel without auxiliary electrodes and the light adjustment panel with auxiliary electrodes, respectively.
Figure 20B:
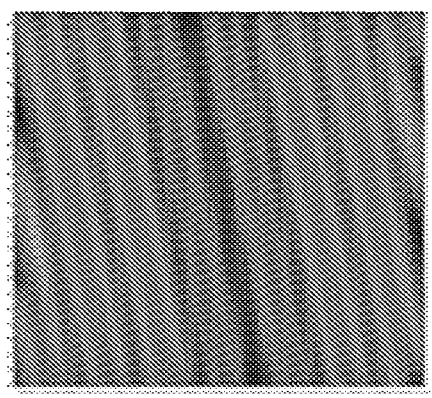

FIG. 19A and FIG. 19B respectively show the white display effect of the light adjustment panel when there is no auxiliary electrode and when there is auxiliary electrode. As shown in FIG. 19A, when there is no auxiliary electrode for shielding, there is a dark area at the gap between the adjacent control electrodes. As shown in FIG. 19B, when the auxiliary electrode is provided for shielding, the dark area at the gap between the adjacent control electrodes can be significantly reduced. More than that, in the gray scale display, the light adjustment panel can also have a better display effect by providing auxiliary electrodes for shielding. FIG. 20A and FIG. 20B respectively show the gray scale display effect of the light adjustment panel when there is no auxiliary electrode and when there is auxiliary electrode. As shown in FIG. 20A, when there is no auxiliary electrode for shielding, there is a dark area at the gap of the adjacent control electrode. As shown in FIG. 20B, when the auxiliary electrode is provided for shielding, there is no significant difference between the brightness at the gap between the control electrodes and other positions.

Figure 21:
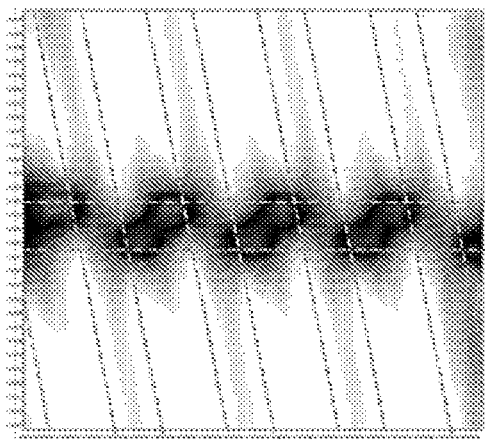
FIG. 21 schematically shows the situation of the dark area of a light adjustment panel according to an embodiment of the present application.

In addition, the setting of the positions and shapes of the common electrode layer and the control electrodes in the light adjustment panel according to the embodiment of the present application is also beneficial for reducing dark areas. In the embodiment of the present application, the common electrode layer includes parallel strip electrodes, and the control electrodes are arranged in an array. In order to make the electric field line start from the electrode layer closer to the light adjustment liquid crystal layer, first reach the light adjustment liquid crystal layer, and then extend back to the electrode layer farther away from the light adjustment liquid crystal layer, the common electrode layer whose shape is parallel strip electrodes is set closer to the light adjustment liquid crystal layer, and the control electrode layer is set farther away from the light adjustment liquid crystal layer. As shown in FIG. 17B, the control electrode 1711 is a planar structure without slits, which does not include the second component electrode extending along the second direction, and the common electrode layer is simply strip electrodes 1706 extending along the first direction, so the control electrodes 1711 and the common electrode layer will not generate the electric field along the first direction. Since the direction of the liquid crystal molecules is the first direction, the direction of the electric field generated by the control electrode layer and the common electrode layer will not be parallel to the direction of the liquid crystal molecules which causes that the liquid crystal molecules cannot be controlled by the electric fields generated by the control electrode layer and the common electrode layer. FIG. 21 schematically shows the situation of the dark area of the light adjustment panel according to the embodiment of the present application, wherein for better clarity, outlines of the electrodes are shown with dotted lines. As shown in FIG. 21, the dark areas are greatly reduced compared to FIG. 1B.

In some embodiments, the control electrodes 1711 arranged in an array are arranged along a first direction and a second direction. The first direction makes an angle less than 90° with the second direction. The strip electrodes 1706 extend along the first direction. First, with this arrangement, the extending direction of the strip electrodes 1706 will be the same as the extending direction of the edges of the control electrodes. In this way, at the gap corresponding to the edge, the electric field will only include the electric field component perpendicular to the direction of the liquid crystal molecules, but not the electric field component parallel to the direction of the liquid crystal molecules. This reduces the situation that since the direction of the electric field is parallel to the direction of the liquid crystal molecules, the liquid crystal molecules cannot be driven by the electric field so that dark areas appear.

Moreover, the angle between the first direction and the second direction is less than 90°, that is, the first direction and the second direction are not perpendicular. Normally, in a display panel, pixels are arranged in a matrix in two directions perpendicular to each other. In the light adjustment panel, when the first direction and the second direction are not perpendicular, the extension direction of the strip electrodes and the auxiliary electrodes of the common electrode is different from the arrangement direction of the pixels of the display panel. This helps reduce the phenomenon of moire.

Figure 22:
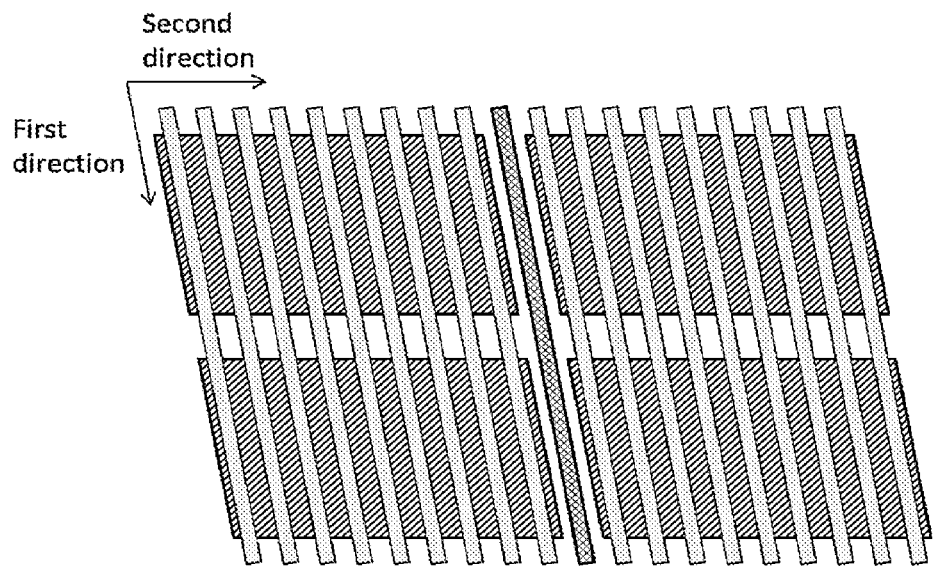
FIG. 22 schematically shows a top view of a light adjustment panel according to an embodiment of the present application.

In some embodiments, the angle between the first direction and the second direction is between 75° and 85°. When the angle between the first direction and the second direction is between 75° and 85°, the effect of reducing moire is better. FIG. 22 schematically shows a top view of a light adjustment panel according to an embodiment of the present application. As shown in FIG. 20, the first direction and the second direction are not perpendicular. In the display panel matched with this light adjustment panel, the pixels are arranged in the second direction and another direction which is perpendicular to the second direction. Moire can be effectively reduced by making the first direction and second direction of the light adjustment panel not perpendicular, and better results can be achieved when the angle between the first direction and the second direction is between 75° and 85°.

Figure 23:
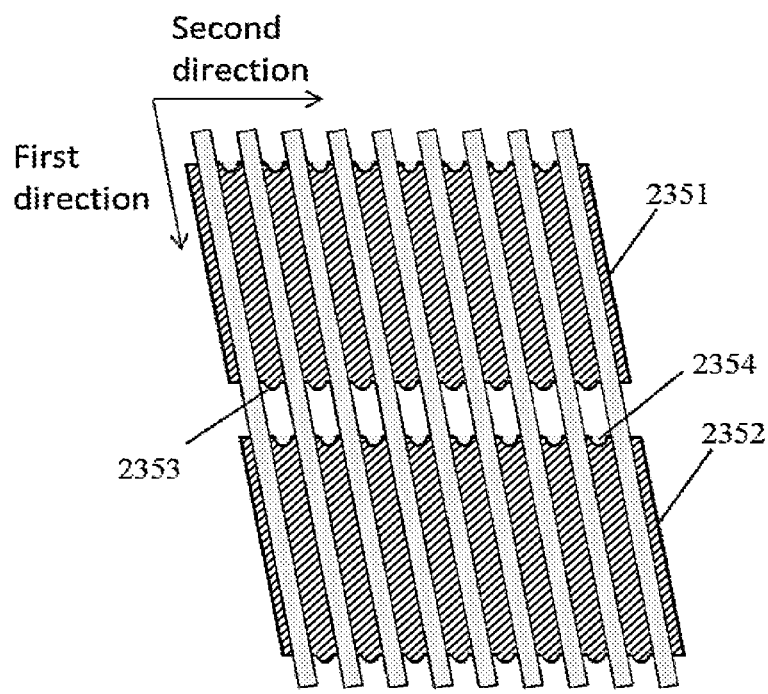
FIG. 23 schematically shows a top view of a light adjustment panel according to an embodiment of the present application.

FIG. 23 schematically shows a top view of a light adjustment panel according to an embodiment of the present application. As shown in FIG. 23, in some embodiments, the control electrodes include a first control electrode 2351 and a second control electrode 2352 adjacent on the first direction. The first control electrode and the second control electrode respectively include first edges extending along the first direction and second edges extending along the second direction. The second edge of the first control electrode 2351 close to the second control electrode 2352 includes protrusions 2353 spaced from each other, and the second edge of the second control electrode 2352 close to the first control electrode 2351 includes concaves 2354 spaced from each other. The protrusions 2353 are at least partially aligned with the concaves 2354 along the first direction. The expression that the protrusions and the concaves are at least partially aligned along the first direction may be understood to mean that, in a direction perpendicular to the first direction, the orthographic projections of the protrusions and the concaves at least partially coincide. It should be understood that protrusion and concaves are a set of relative concepts. According to the perspective of FIG. 23, the space between adjacent protrusions 2353 can be regarded as a kind of concave, and the space between adjacent concaves 2354 can be regarded as a kind of protrusion. Therefore, this embodiment can also be understood as, the second edge of the first control electrode close to the second control electrode includes protrusions spaced from each other and the second edge of the second control electrode close to the first control electrode also includes the protrusions spaced from each other, and the protrusions of the first control electrode and the protrusions of the second control electrode are alternately arranged, that is, on the second direction, the projections of the first control electrode along the first direction are located at the spacing between the protrusions of the second control electrode, and the projections of the protrusion of the second control electrode along the first direction is located at the spacing of the protrusions of the first control electrode.

Although the common electrode layer has been set as strip electrodes, since the first direction and the second direction are not perpendicular, the electric field formed by the second edge of the control electrode and the common electrode still has an electric field component parallel to the direction of the liquid crystal, causing the liquid crystals at the edges cannot be driven by an electric field, resulting in dark areas. By setting the second edge to have protrusions and concaves, the component of the electric field parallel to the direction of the liquid crystal can be reduced, thereby reducing the dark area.

Figure 24:
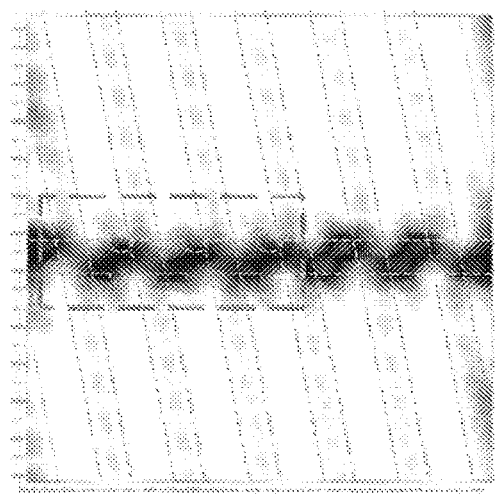
FIG. 24 schematically shows the situation of the dark area of the light adjustment panel with the second edges of the control electrodes having protrusions and concaves.

FIG. 24 schematically shows the situation of the dark area of the light adjustment panel when the second edge has protrusions and concaves, where the outline of the control electrode is drawn with dotted lines for better clarity. In order to more clearly compare the difference between the situation where there are protrusions and concaves and the situation where there is no protrusion or concave, the second edge inside the dotted line frame has protrusions and concaves, and the second edge outside the dotted line frame do not have protrusion or concave. It can be seen from FIG. 24 that the width and degree of obvious of the dark area inside the dotted line frame are weaker than those of the dark area outside the dotted line frame. This shows that by providing protrusions and concaves on the second edges, the dark area can be modified.

Figure 25:
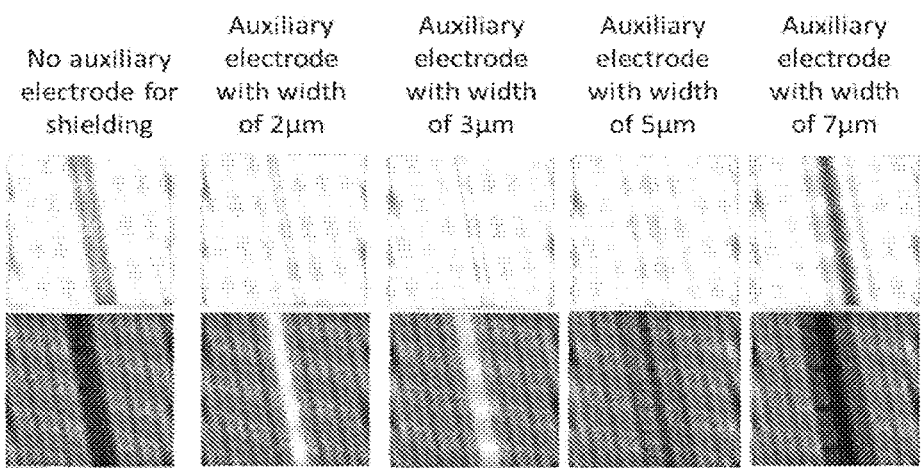
FIG. 25 schematically shows the situations of the dark areas corresponding to auxiliary electrodes of different widths.

In some embodiments, the width of the auxiliary electrodes is one to two times as the width of the gap. The inventor verified the shielding effect of auxiliary electrodes with different widths through experiments. FIG. 25 schematically shows the situations of dark areas corresponding to auxiliary electrodes of different widths, which respectively shows the situations of dark areas at the gap between the control electrodes when the display screen is white display and grayscale display. In this experiment, the width of gap between the control electrodes is 3.5 µm. The experiment verified five cases, including when there is no auxiliary electrode, when the width of the auxiliary electrode is 2 µm, 3 µm, 5 µm, and 7 µm. As shown in FIG. 25, when the width of the auxiliary electrode is 5 µm, the dark area is the least obvious in both white display and grayscale display.

In summary, the light adjustment panel according to the embodiment of the present application provides auxiliary electrodes at the position corresponding to the gap between the control electrodes, thereby improving the electric field near the gap and adjusting the deflection direction of the liquid crystal, thereby modifying light leakage and the dark zone. Moreover, by arranging the auxiliary electrodes close to the weak alignment region, the application also makes the electric field of the auxiliary electrodes more targeted and the width of the auxiliary electrodes narrower, thereby improving the transmittance of the light adjustment panel. In addition, by the setting of gate lines and dummy wires, this application also makes the auxiliary electrodes unable to be distinguished by human eyes, which improves the display quality.

Figure 26:
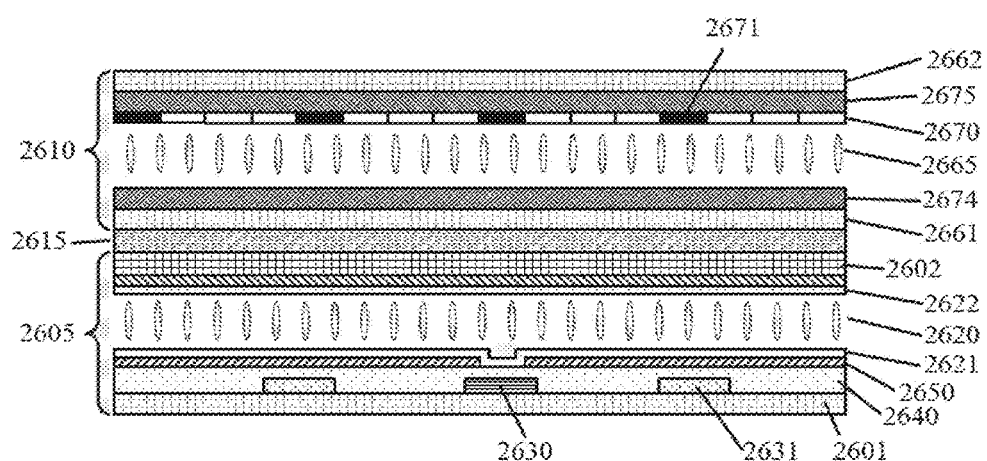
FIG. 26 schematically shows a cross-sectional view of an overlapped screen panel according to an embodiment of the present application.

According to another aspect of the present application, an overlapped screen panel is provided. The overlapped screen panel includes the light adjustment panel according to any embodiment of the present application, and a display panel. The display panel and the light adjustment panel are stacked. FIG. 26 schematically shows a cross-sectional view of an overlapped screen panel according to an embodiment of the present application. As shown in FIG. 26, the display panel 2610 and the light adjustment panel 2605 are stacked. The display panel 2610 and the light adjustment panel 2605 can be connected through an optical glue layer 2615 between them. The light adjustment panel includes a first substrate 2601, a second substrate 2602 and a light adjustment liquid crystal layer 2620 sandwiched between them. The two sides of the light adjustment liquid crystal layer 2620 are respectively provided with a first alignment layer 2621 and a second alignment layer 2622. Auxiliary electrodes 2630 and gate lines 2631 are arranged on the first substrate 2601. A first insulating layer 2640 is arranged on the auxiliary electrodes 2630 and the gate lines 2631. A control electrode layer 2650 is arranged on the first insulating layer 2640, which includes control electrodes arranged in an array. A common electrode layer 2651 is arranged on the second substrate 2602. It should be understood that FIG. 26 only schematically shows the structure of the light adjustment panel 2605, and does not show elements that do not affect the understanding of the present application. The light adjustment panel 2605 may also include the elements and structures described in any of the above-mentioned embodiments. The display panel 2610 may be a commonly used display panel in this field. The display panel 2610 includes a third substrate 2661 and a fourth substrate 2662 and a display liquid crystal layer 2665 sandwiched therebetween. Both sides of the display liquid crystal layer 2665 are provided with alignment layers (omitted in FIG. 26). A color filter layer 2670 is disposed on one side of the display liquid crystal layer 2665, including a red filter layer, a green filter layer, a blue filter layer, and a black matrix 2671. The red filter layer, the green filter layer, and the blue filter layer together define the pixels of the display panel, and the black matrix 2671 separate the pixels. A control layer 2674 is arranged on the third substrate 2661, which may include structures such as control electrode, gate line, and insulating layer. A common electrode layer 2675 is arranged on the fourth substrate 2661. It should be understood that although in FIG. 26, the control layer 2674 and the common electrode layer 2675 are arranged on both sides of the display liquid crystal layer 2665, in other embodiments, depending on the specific forms of the common electrode and the control electrode, the control layer 2674 and the common electrode layer 2675 may be disposed on the same side of the display liquid crystal layer 2665.

The display panel should be able to cooperate with the light adjustment panel according to the embodiment of the present application. For example, the number, size and arrangement of pixels of the display panel should match the zones of the light adjustment panel, for example, the length and width of the zones of the light adjustment panel should be integer multiples of the length and width of the pixels of the display panel. For another example, after the display panel and the light adjustment panel are assembled together, the gaps between the control electrodes of the light adjustment panel can be aligned with the gaps between the pixels of the display panel. For example, the orthographic projection of the black matrix 2671 of the display panel on the first substrate 2601 is at least partially overlapped with the orthographic projection of the gap between the control electrodes of the light adjustment panel on the first substrate 2601. For another example, as mentioned above, the inflection points of the gate lines of the light adjustment panel may appear at the gaps between the pixels of the display panel, etc. The overlapped screen panel according to the embodiment of the present application has all the advantages and effects of the light adjustment panel according to the embodiment of the present application, and will not be repeated here.

Figure 27:
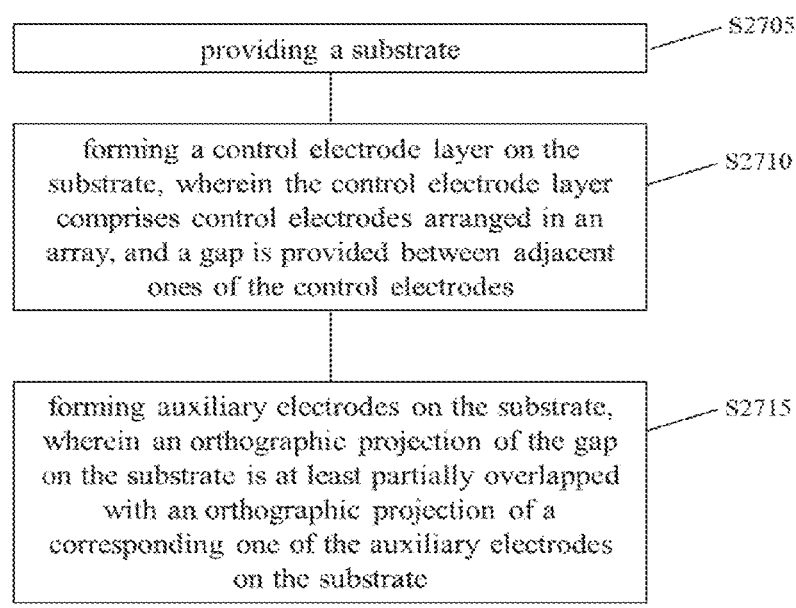
FIG. 27 schematically shows a flowchart of a method for manufacturing a light adjustment panel according to an embodiment of the present application.

According to still another aspect of the present application, a method for manufacturing a light adjustment panel is provided. FIG. 27 schematically shows a flowchart of a method for manufacturing a light adjustment panel according to an embodiment of the present application. As shown in FIG. 27, the method includes: in step S2705, providing a substrate; in step S2710, forming a control electrode layer on the substrate, wherein the control electrode layer includes control electrodes arranged in an array, and there is a gap between adjacent control electrodes; and, in step S2715, forming auxiliary electrodes on the substrate, wherein the orthographic projection of the auxiliary electrodes on the substrate at least partially coincide with the orthographic projection of the gap on the substrate. It should be noted that there is no order requirement for step S2710 and step S2715. Depending on the structural design of the light adjustment panel to be produced, the auxiliary electrodes can be formed first, and then the control electrodes can be formed, or the control electrodes can be formed first, and then the auxiliary electrodes can be formed. The expression "the orthographic projections of the auxiliary electrodes on the substrate at least partially coincide with the orthographic projection of the gap on the substrate" should not be understood to mean that the auxiliary electrodes need to be formed after the control electrodes are formed. It should be understood as that no matter whether the auxiliary electrode or the control electrode is formed first, the structure of the obtained light adjustment panel should meet the requirement that the orthographic projections of the auxiliary electrodes on the substrate and the orthographic projections of the gap on the substrate at least partially coincide. The method is described in detail below.

First, a substrate is provided. The substrate can be any suitable substrate, such as a glass substrate, or other transparent material substrates with a function carrying objects.

Then, the control electrode layer and auxiliary electrodes are respectively formed on the substrate. The material of the control electrode layer may be a transparent conductive material, for example, indium tin oxide (ITO for short). The method for forming the control electrode layer may be to deposit a layer of control electrode material, then coat a photoresist layer on the control electrode material, expose and develop the photoresist layer, and then use an etching solution to etch the control electrode material to obtain the control electrodes, and then remove the photoresist. The auxiliary electrode can be a transparent conductive material e.g. ITO, or an opaque conductive material such as metal. A similar method can also be used to form the auxiliary electrodes, for example, through steps such as depositing auxiliary electrode material, coating photoresist, exposing and developing, etching auxiliary electrode material, and removing photoresist. Since both the control electrode layer and the auxiliary electrodes are formed on the substrate, the alignment accuracy of the two is higher, and the positional relationship between the auxiliary electrodes and the control electrodes is more precise, so that the electric field generated by the auxiliary electrodes can be more accurately aimed at the light leak at the gap. The meaning and specific operation process of steps such as depositing electrode material, coating photoresist, exposing and developing, etching electrode material, removing photoresist are clear in the art, and will not be repeated here. These steps, taken together, can collectively be referred to as an "exposure and etching operation". As mentioned earlier, depending on the structural design of the light adjustment panel to be manufactured, the auxiliary electrodes can be formed first or the control electrodes can be formed first. The two situations are introduced separately below.

In some embodiments, step S2715 may include: forming a first electrode material layer on the substrate, and performing a first exposure and etching operation on the first electrode material layer to obtain the auxiliary electrodes. After obtaining the auxiliary electrodes, the method for manufacturing the light adjustment panel according to the embodiment of the present application further includes: forming a first insulating layer on the side of the auxiliary electrodes away from the substrate. Then, step S2710 may include: forming a second electrode material layer on the side of the first insulating layer away from the substrate, and performing a second exposure and etching operation on the second electrode material layer to obtain the obtained the control electrode layer. In the light adjustment panel formed through the above steps, the control electrode layer is farther away from the substrate than the auxiliary electrodes. In this case, the auxiliary electrodes can be formed in the same step as the gate lines of the light adjustment panel. For example, a metal layer can be deposited on the surface of the substrate, and after exposure and etching processes, patterns of gate lines and auxiliary electrodes can be formed. Then, an insulating layer can be deposited on the gate lines and auxiliary electrodes. The material of the insulating layer may be silicon nitride, for example. Then, first via holes for connecting the auxiliary electrodes and the control electrodes and second via holes for connecting the gate lines and the control electrodes may be formed in the insulating layer through exposure and etching operations. Then, the material of the control electrodes can be deposited or sputtered on the insulating layer, and the control electrodes can be formed through exposure and etching processes. The material of the control electrodes can enter the aforementioned via holes, so that the control electrodes can be electrically connected with the gate lines and the auxiliary electrodes. After forming the auxiliary electrodes, the positions of the control electrodes to be formed have in fact been determined. Therefore, when etching the control electrodes, the etched positions should be aligned with the positions of the auxiliary electrodes. Through the above processes, the array substrate of the light adjustment panel can be obtained.

In a further embodiment, the method forms the common electrode of the light adjustment panel in the opposite substrate opposite to the array substrate. The process of forming the opposite substrate may include, for example: providing a second substrate, coating a black matrix layer material on the second substrate, exposing and developing to form a mark for alignment with the array substrate. Then, a common electrode material layer is formed by depositing or sputtering to obtain a whole layer of common electrode layer. In some embodiments, it is also needed to coat the spacing material on the common electrode layer, and after exposure and development, the spacers are obtained. Through the above processes, the opposite substrate of the light adjustment panel can be obtained.

Finally, the light adjustment panel according to the embodiment of the present application can be obtained by dripping the liquid crystal and assembling the array substrate and the opposite substrate.

In some other embodiments, the control electrodes may be formed first. In this case, step S2710 may include: forming a third electrode material layer on the substrate, and performing a third exposure and etching operation on the third electrode material layer to obtain the control electrode layer. In these embodiments, the method further includes: forming a second insulating layer on a side of the control electrode layer away from the substrate. Moreover, step S2715 may include: forming a fourth electrode material layer on the side of the second insulating layer away from the substrate, and performing a fourth exposure and etching operation on the fourth electrode material layer to obtain the auxiliary electrodes. In the light adjustment panel formed through the above steps, the control electrode layer is closer to the substrate than the auxiliary electrodes. In this case, the common electrode of the light adjustment panel can also be provided on the substrate, and the auxiliary electrodes and the common electrode can be formed in the same step. For example, after the control electrode layer and the second insulating layer have been formed, when the fourth exposure and etching operations are performed on the fourth electrode material layer, the patterns of the auxiliary electrodes and the common electrode can be simultaneously formed, and then after the exposure and etching operations, the common electrode and auxiliary electrode would be obtained. The patterns of the auxiliary electrodes and the common electrode can also be set so that the common electrode and the auxiliary electrodes are electrically connected. After the control electrodes are formed, the positions of the gaps between the control electrodes have been determined, and the positions of the auxiliary electrodes to be formed have in fact been determined. Therefore, when etching the fourth electrode material layer, the remaining material should be aligned with the positions of the gaps. Through the above processes, the array substrate of the light adjustment panel can be obtained.

In the above embodiments, the common electrode is also formed on the array substrate, so the process of forming the opposite substrate may only include steps such as providing a third substrate, forming a mark for alignment with the array substrate, forming spacers in the cell, etc., which won't be repeated them here. Then, similarly, after dripping liquid crystals and assembling the array substrate and the opposite substrate, the light adjustment panel according to the embodiment of the present application can be obtained.

The light adjustment panel obtained by the above method provides auxiliary electrodes at the positions corresponding to the gaps between the control electrodes, thereby improving the electric field near the gaps and adjusting the deflection direction of the liquid crystal, thereby improving the phenomenon of light leakage and dark area.

As will be understood by those skilled in the art, although the various steps of the methods in the embodiments of the present disclosure are described in specific orders in the drawings, this does not require or imply that these steps must be performed in the specific orders, unless the context clearly illustrate otherwise. Additionally or alternatively, multiple steps may be combined into one step for execution, and/or one step may be decomposed into multiple steps for execution. Furthermore, other method steps may be inserted between the steps. The inserted steps may represent improvements of the method as described herein, or may be unrelated to the method. Also, a given step may not be fully complete before the next step starts.

In the description of the embodiments of the present disclosure, the orientations or positional relationships indicated by the terms "upper", "lower", "left", "right" or the like are based on the orientations or positional relationships shown in the drawings, and are only for the convenience of describing the present invention, not requiring that the embodiments of the disclosure to be constructed and operated in a particular orientation and thus should not be construed as limitations on the present disclosure.

In the description of this specification, descriptions with reference to the terms "an embodiment", "another embodiment" and the like mean that a particular feature, structure, material, or characteristic described in connection with the embodiment is included in at least one embodiment of the present disclosure. In this specification, the schematic representations of the above terms are not necessarily directed to the same embodiment or example. Furthermore, the described specific features, structures, materials or characteristics may be combined in any suitable manner in any one or more embodiments or examples. In addition, those skilled in the art may combine different embodiments or examples and features of different embodiments or examples described in this specification if there is no conflicting. In addition, it should be noted that in this specification, the terms "first", "second", "third", "fourth" and the like are used for description purposes only, and cannot be understood as indicating or implying relative importance or implicitly indicating the quantity of the indicated technical features.

The above description is only a specific implementation of the present disclosure, but the protection scope of the present disclosure is not limited thereto. Changes or substitutions that can be easily thought by the person skilled in the art within the technical scope disclosed in the present disclosure should be covered by the protection scope of the present disclosure. Therefore, the protection scope of the present disclosure should be determined by the protection scope of the claims.

We claim:

1. A light adjustment panel, comprising:
    a common electrode layer, a control electrode layer and a light adjustment liquid crystal layer arranged in stack, and
    auxiliary electrodes,
    wherein the control electrode layer comprises control electrodes arranged in an array, and a gap is provided between adjacent ones of the control electrodes,
    wherein an orthographic projection of the gap on the common electrode layer is at least partially overlapped with an orthographic projection of a corresponding one of the auxiliary electrodes on the common electrode layer,
    the light adjustment panel further comprising a gate line laver, wherein the gate line layer comprises gate lines, each of the gate lines is electrically connected to a corresponding one of the control electrodes, the gate lines extend along a first direction,
    the light adjustment panel further comprising dummy wires, wherein the dummy wires extend along a second direction, with the first direction being at an angle to the second direction,
    wherein the gate lines are bent at inflection points, and orthographic projections of straight lines where the dummy wires are located on the gate line layer pass through the inflection points.

2. The light adjustment panel according to claim 1, wherein the gap comprises a first boundary, a second boundary, a weak alignment region and a non-weak alignment region, wherein the weak alignment region is closer to the first boundary than the non-weak alignment region, and the non-weak alignment region is closer to the second boundary than the weak alignment region,
    wherein the light adjustment liquid crystal layer comprises a first light adjustment liquid crystal and a second light adjustment liquid crystal, an orthographic projection of the first light adjustment liquid crystal on the gap is in the weak alignment region, and an orthographic projection of the second light adjustment liquid crystal on the gap is in the non-weak alignment region, wherein an average anchoring energy of the first light adjustment liquid crystal is smaller than an average anchoring energy of the second light adjustment liquid crystal,
    wherein an orthographic projection of the first boundary on the corresponding one of the auxiliary electrodes is closer to a midline of the corresponding one of the auxiliary electrodes than an orthographic projection of the second boundary on the corresponding one of the auxiliary electrodes.

3. The light adjustment panel according to claim 2, wherein a distance between an orthographic projection of a midline of the gap on the common electrode layer and an orthographic projection of the midline of the corresponding one of the auxiliary electrodes on the common electrode layer is in a range of 0.5 μm to 1.5 μm.

4. The light adjustment panel according to claim 1, wherein the control electrodes arranged in the array are arranged along the first direction and the second direction, wherein the auxiliary electrodes comprise first auxiliary electrodes extending along the first direction, wherein orthographic projections of the first auxiliary electrodes and the gate lines on the common electrode layer are arranged in parallel and spaced from each other.

5. The light adjustment panel according to claim 4, wherein a distance between any adjacent two of the orthographic projections of the first auxiliary electrodes and the gate lines on the common electrode layer is same.

6. The light adjustment panel according to claim 4, wherein the auxiliary electrodes further comprise second auxiliary electrodes extending along the second direction, wherein orthographic projections of the dummy wires and the second auxiliary electrodes on the common electrode layer are arranged in parallel and spaced from each other.

7. The light adjustment panel according to claim 6, wherein at least two of the dummy wires, the gate lines, and the auxiliary electrodes are in a same layer.

8. The light adjustment panel according to claim 4, further comprising a voltage control chip, wherein the voltage control chip is configured to be connected to the gate lines through output pins, and to be connected to the control electrodes through the gate lines, to control voltage of the control electrodes, wherein all of the control electrodes are connected to output pins with a same voltage polarity.

9. The light adjustment panel according to claim 1, wherein the corresponding one of the auxiliary electrodes is electrically connected to one of the control electrodes on both sides of the gap.

10. The light adjustment panel according to claim 1, wherein the common electrode layer is sandwiched between the light adjustment liquid crystal layer and the control electrode layer,
wherein the common electrode layer comprises strip electrodes arranged in parallel, the auxiliary electrodes are located in the common electrode layer, and are parallel to and electrically connected to the strip electrodes.

11. The light adjustment panel according to claim 10, wherein the control electrodes arranged in the array are arranged along a first direction and a second direction, wherein the first direction is at an angle less than 90° to the second direction,
wherein the strip electrodes extend along the first direction.

12. The light adjustment panel according to claim 11, wherein the angle between the first direction and the second direction is between 75° and 85°.

13. The light adjustment panel according to claim 11, wherein the control electrodes comprise a first control electrode and a second control electrode adjacent along the first direction, wherein the first control electrode and the second control electrode respectively comprise first edges extending along the first direction and second edges extending along the second direction,
wherein the second edge of the first control electrode close to the second control electrode comprises protrusions that are spaced from each other, and the second edge of the second control electrode close to the first control electrode comprises concaves that are spaced from each other, wherein the protrusions are at least partially aligned with the concaves along the first direction.

14. The light adjustment panel according to claim 10, wherein a width of the auxiliary electrodes is one to two times as a width of the gap.

15. An overlapped screen panel, comprising:
the light adjustment panel according to claim 1, and
a display panel stacked with the light adjustment panel.

16. A method of manufacturing a light adjustment panel, comprising:
providing a substrate,
forming a control electrode layer on the substrate, wherein the control electrode layer comprises control electrodes arranged in an array, and a gap is provided between adjacent ones of the control electrodes,
forming auxiliary electrodes on the substrate, wherein an orthographic projection of the gap on the substrate is at least partially overlapped with an orthographic projection of a corresponding one of the auxiliary electrodes on the substrate,
forming a gate line layer, wherein the gate line layer comprises gate lines, each of the gate lines is electrically connected to a corresponding one of the control electrodes, the gate lines extend along a first direction,
forming dummy wires, wherein the dummy wires extend along a second direction, with the first direction being at an angle to the second direction,
wherein the gate lines are bent at inflection points, and orthographic projections of straight lines where the dummy wires are located on the gate line layer pass through the inflection points.

17. The method according to claim 16, wherein,
forming the auxiliary electrodes on the substrate comprises:
forming a first electrode material layer on the substrate; and
performing a first exposure and etching operation on the first electrode material layer to obtain the auxiliary electrodes;
wherein the method further comprises forming a first insulating layer on a side of the auxiliary electrodes away from the substrate; and
wherein forming the control electrode layer on the substrate comprises:
forming a second electrode material layer on a side of the first insulating layer away from the substrate; and
performing a second exposure and etching operation on the second electrode material layer to obtain the control electrode layer.

18. The method according to claim 16, wherein,
forming the control electrode layer on the substrate comprises:
forming a third electrode material layer on the substrate, and
performing a third exposure and etching operation on the third electrode material layer to obtain the control electrode layer;

wherein the method further comprises forming a second insulating layer on a side of the control electrode layer away from the substrate;

wherein forming the auxiliary electrodes on the substrate comprises:
  forming a fourth electrode material layer on a side of the second insulating layer away from the substrate, and
  performing a fourth exposure and etching operation on the fourth electrode material layer to obtain the auxiliary electrodes.

* * * * *